(12) United States Patent
Edwards et al.

(10) Patent No.: US 8,544,002 B2
(45) Date of Patent: Sep. 24, 2013

(54) MANAGING VIRTUAL OVERLAY INFRASTRUCTURES

(75) Inventors: Nigel Edwards, Bristol (GB); Adrian John Baldwin, Bristol (GB); Patrick Goldsack, Bristol (GB); Antonio Lain, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 1060 days.

(21) Appl. No.: 11/718,196

(22) PCT Filed: Oct. 28, 2005

(86) PCT No.: PCT/EP2005/055639
§ 371 (c)(1),
(2), (4) Date: Dec. 18, 2008

(87) PCT Pub. No.: WO2006/045845
PCT Pub. Date: May 4, 2006

(65) Prior Publication Data
US 2009/0300605 A1    Dec. 3, 2009

(30) Foreign Application Priority Data
Oct. 29, 2004    (GB) .................................. 0424175.8

(51) Int. Cl.
*G06F 9/50*    (2006.01)
(52) U.S. Cl.
USPC .............................................. 718/1; 718/104
(58) Field of Classification Search
None
See application file for complete search history.

(56) References Cited

U.S. PATENT DOCUMENTS

| 4,912,628 | A  | * | 3/1990 | Briggs | 718/100 |
| 5,734,865 | A  |   | 3/1998 | Yu | |
| 5,964,886 | A  |   | 10/1999 | Slaughter et al. | |
| 6,757,778 | B1 | * | 6/2004 | van Rietschote | 711/6 |
| 7,093,086 | B1 | * | 8/2006 | van Rietschote | 711/161 |
| 7,100,089 | B1 | * | 8/2006 | Phelps | 714/42 |
| 7,103,625 | B1 | * | 9/2006 | Hipp et al. | 709/201 |
| 7,155,593 | B2 | * | 12/2006 | Kano | 711/165 |
| 7,260,820 | B1 | * | 8/2007 | Waldspurger et al. | 718/1 |
| 7,603,670 | B1 | * | 10/2009 | van Rietschote | 718/1 |
| 2002/0055989 | A1 | | 5/2002 | Stringer-Calvert et al. | |

(Continued)

FOREIGN PATENT DOCUMENTS

| EP | 0709779 | 5/1996 |
| EP | 1387547 | 2/2004 |
| WO | 0125920 A1 | 4/2001 |

OTHER PUBLICATIONS

Lee, et al., "Petal: Distributed Virtual Disks", Proceedings of the Seventh International Conference on Architectural support for programming languages and operating systems, p. 84-92, Oct. 1-4, 1996, Cambridge, Massachusetts, United States.

(Continued)

*Primary Examiner* — Eric Coleman

(57) ABSTRACT

A system has a virtual overlay infrastructure mapped onto physical resources for processing, storage and network communications, the virtual infrastructure having virtual entities for processing, storage and network communications. Each virtual infrastructure can be passivated by suspending applications, stopping operating systems, and storing state, to enable later reactivation. This is simpler for a complete virtual infrastructure than for groups of virtual entities and physical entities. It enables cloned virtual infrastructure to be created for testing, upgrading or sharing without risk to the parent. On failure, reversion to a previous working clone is feasible.

21 Claims, 14 Drawing Sheets

(56) References Cited

U.S. PATENT DOCUMENTS

| | | | |
|---|---|---|---|
| 2002/0069369 A1* | 6/2002 | Tremain | 713/201 |
| 2002/0091872 A1 | 7/2002 | Bourke-Dunphy et al. | |
| 2002/0144144 A1 | 10/2002 | Weiss et al. | |
| 2003/0037185 A1* | 2/2003 | Davis et al. | 710/1 |
| 2003/0051021 A1* | 3/2003 | Hirschfeld et al. | 709/223 |
| 2003/0097393 A1 | 5/2003 | Kawamoto et al. | |
| 2003/0105810 A1 | 6/2003 | McCrory et al. | |
| 2003/0182349 A1* | 9/2003 | Leong et al. | 709/100 |
| 2004/0010618 A1 | 1/2004 | Thomas | |
| 2004/0160449 A1* | 8/2004 | Gossalia et al. | 345/543 |
| 2004/0205101 A1 | 10/2004 | Radhakrishnan | |
| 2004/0221290 A1* | 11/2004 | Casey et al. | 718/104 |
| 2005/0120160 A1* | 6/2005 | Plouffe et al. | 711/1 |
| 2006/0195848 A1* | 8/2006 | Arndt et al. | 718/104 |
| 2009/0125904 A1* | 5/2009 | Nelson | 718/1 |
| 2009/0282101 A1* | 11/2009 | Lim et al. | 709/203 |

OTHER PUBLICATIONS

Joe Touch, Dynamic Internet overlay Deployment and management using the X-Bone, Jul. 2001, pp. 117-135.

X. Jiang et al., "VIOLIN: Virtual Internetworking on Overlay Infrastructure," Purdue University Department of Computer Science, Jul. 2003, pp. 1-6.

Peter M. Chen et al., "When Virtual is Better Than Real," University of Michigan, 2001, pp. 133-138.

Andrew Whitaker et al., "Constructing Services with Interposable Virtual Hardware," University of Washington, Mar. 2004.

Xu, D: Selected Publications—XP-002363449, Dec. 20, 2003.

Sven Graupner et al., "Adaptive Control System for Server Groups in Enterprise Data Center," IEEE International Symposium on Cluster Computing and the Grid, 2004, pp. 736-743.

Kinshuk Govil et al., "Cellular Disco: resource management using virtual clusters on shared-memory multiprocessors," XP-000919655, 1999, pp. 154-169.

Paul R. Barham et al., "Xen 2002," Technical Report, University of Cambridge, Jan. 2003, pp. 1-15.

Paul Knight et al., "Network based IP VPN architecture using virtual routers," Internet Engineering Task Force, Apr. 2004.

R. Baird, "Virtual Storage Architecture Guide (VSAG)," IEEE, 1995, pp. 312-326.

Paul Barham et al., "Xen and the Art of Virtualization," University of Cambridge Computer Laboratory, XP-002298786, pp. 164-177, 2003.

GB Search Report dated Feb. 28, 2005 for GB0424126.1.
GB Search Report dated Feb. 28, 2005 for GB0424149.3.
ISR mailed Feb. 8, 2006 for PCT/EP2005/055642.
GB Search Report dated Feb. 28, 2005 for GB0424177.4.
ISR mailed Feb. 8, 2006 for PCT/EP2005/055640.
ISR mailed Jan. 16, 2006 for PCT/EP2005/055638.
GB Search Report dated Feb. 28, 2005 for GB0424175.8.
ISR mailed Mar. 17, 2006 for PCT/EP2005/055639.

* cited by examiner

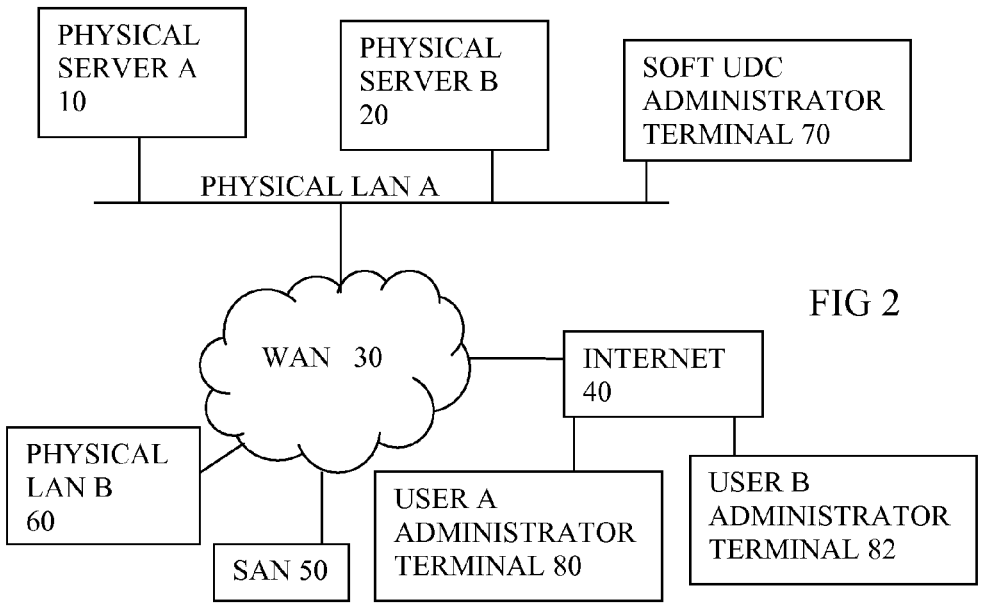
FIG 2
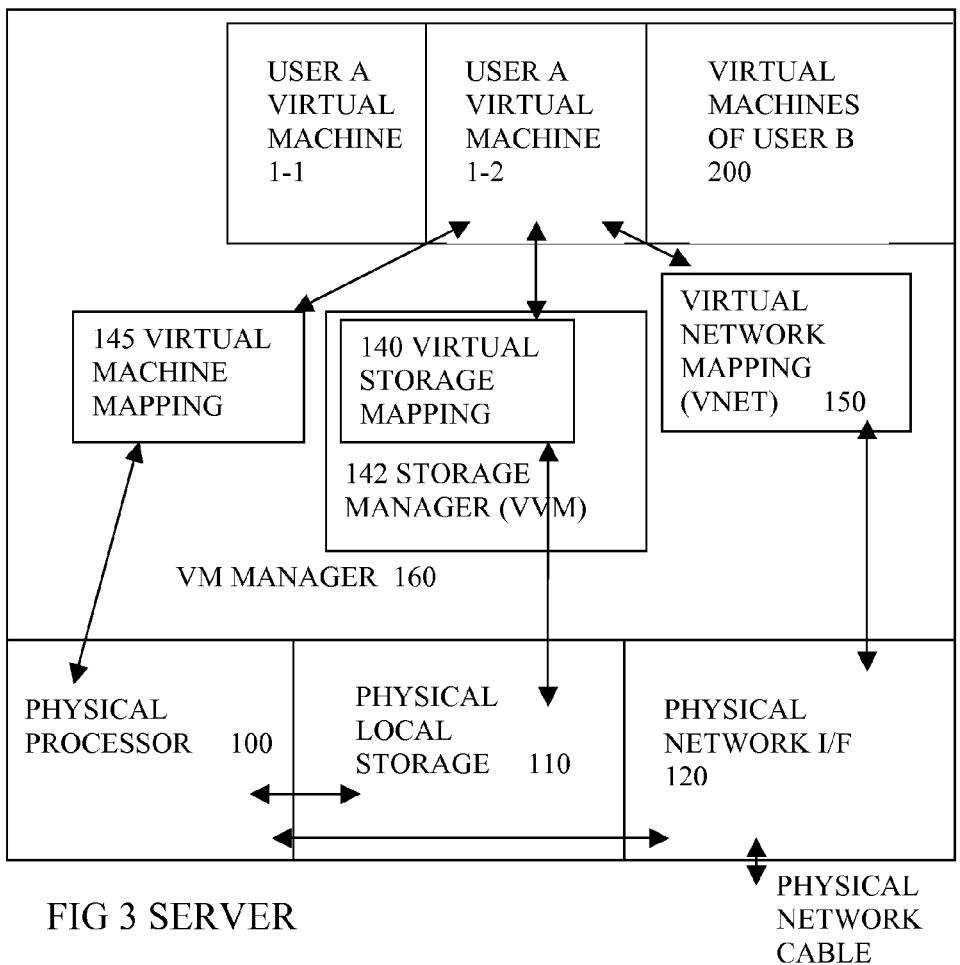
FIG 3 SERVER

FIG 4
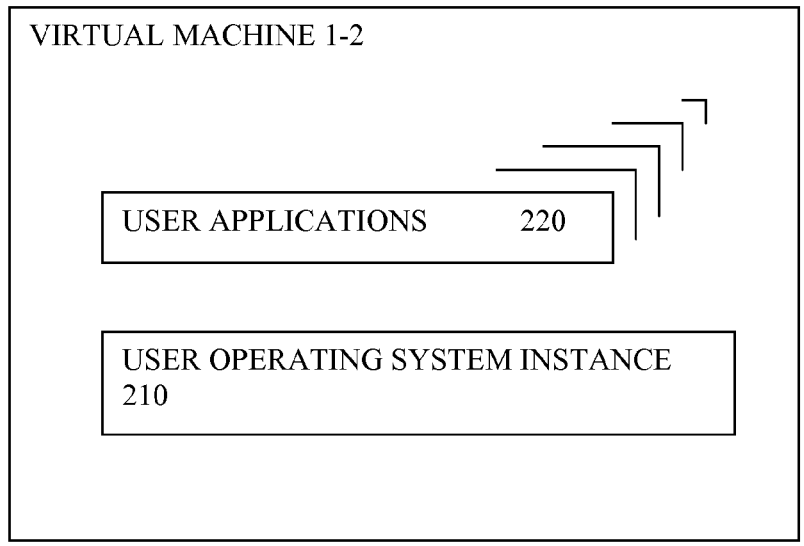
FIG 5, VIRTUAL NETWORK
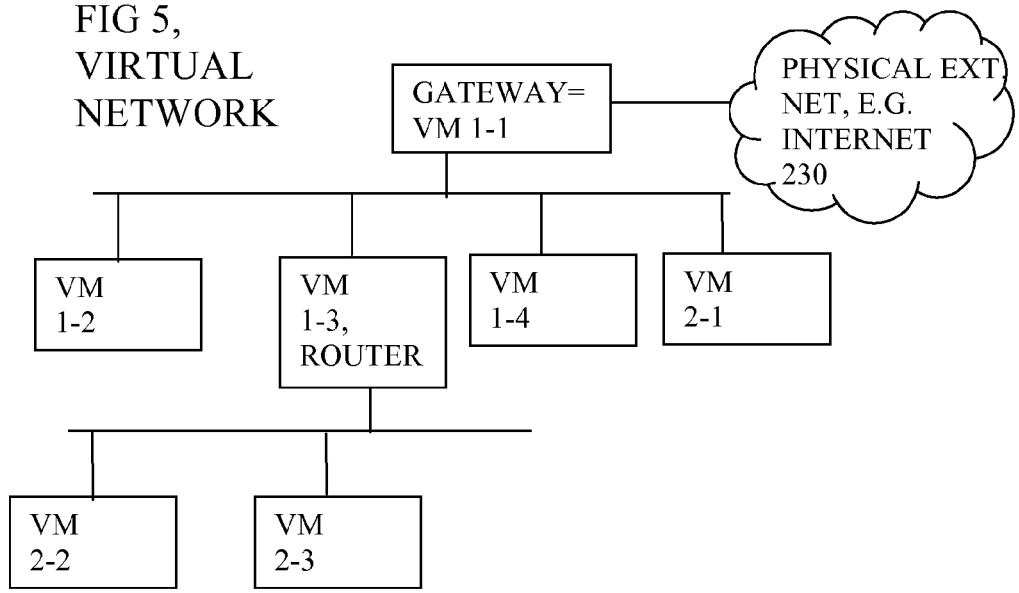

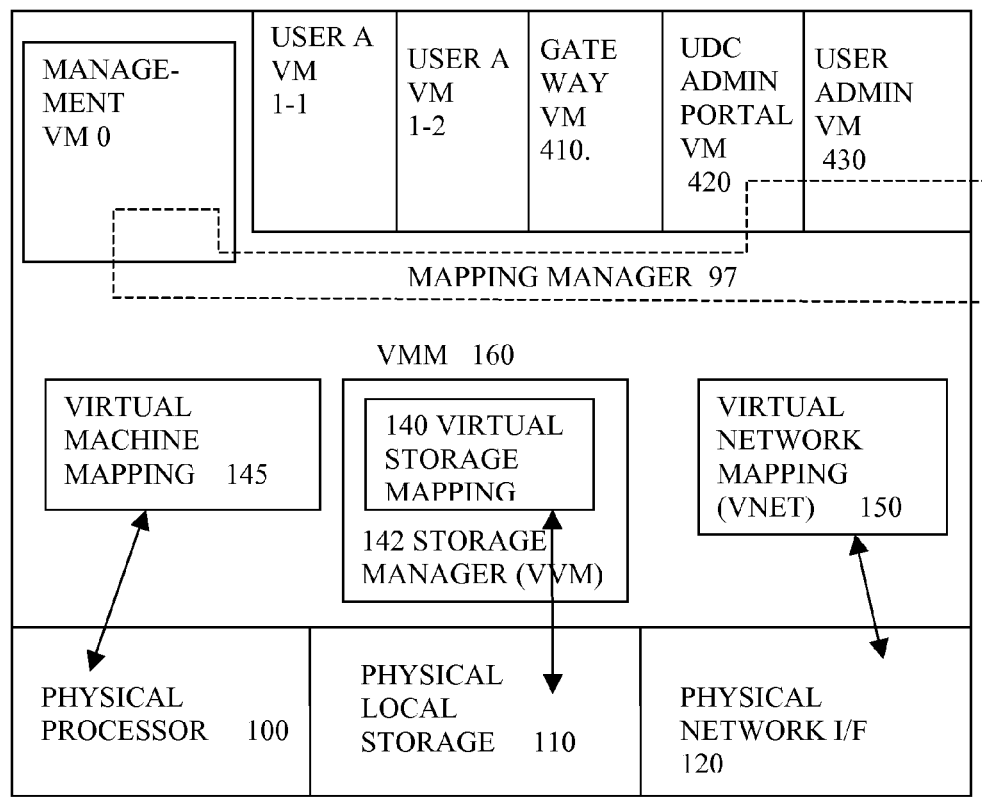
FIG 6 SERVER

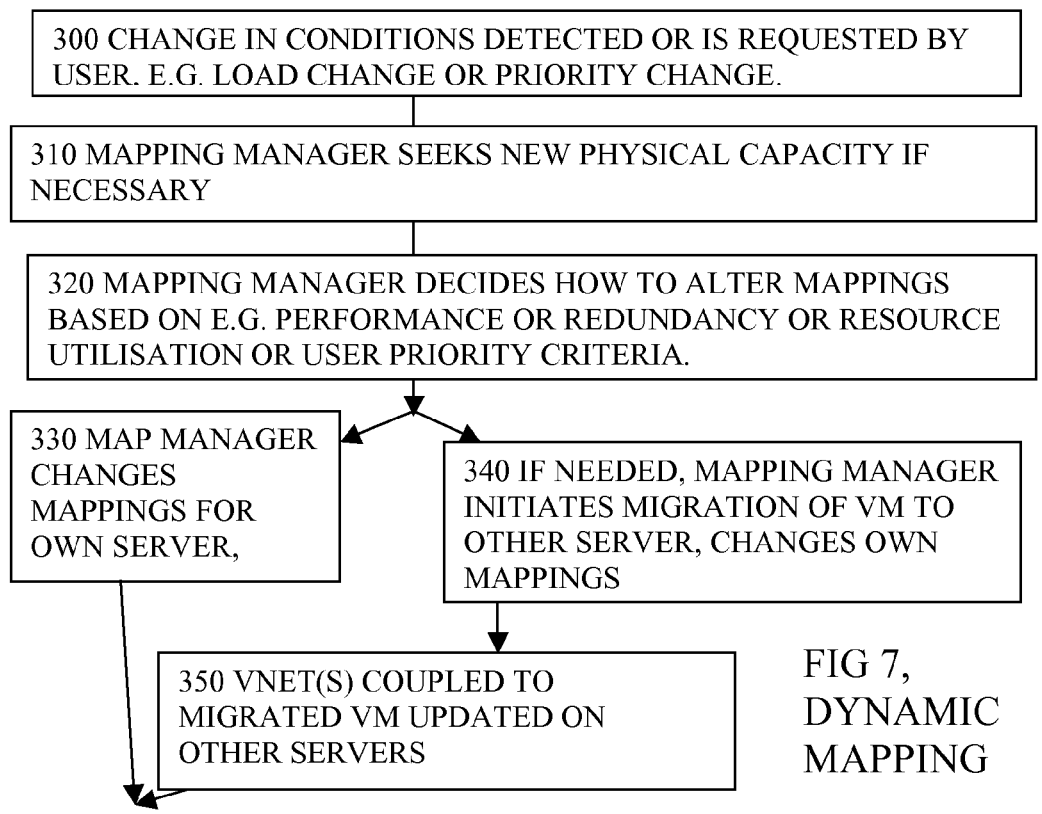

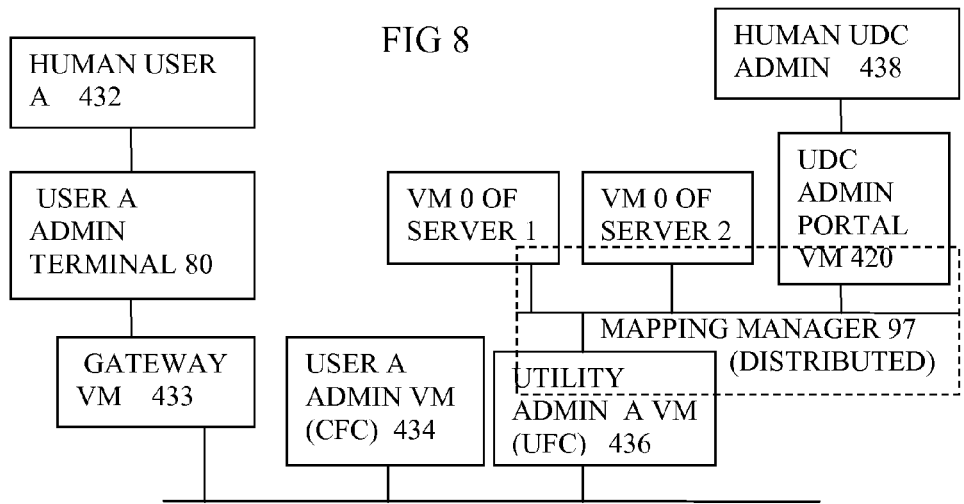

FIG 8

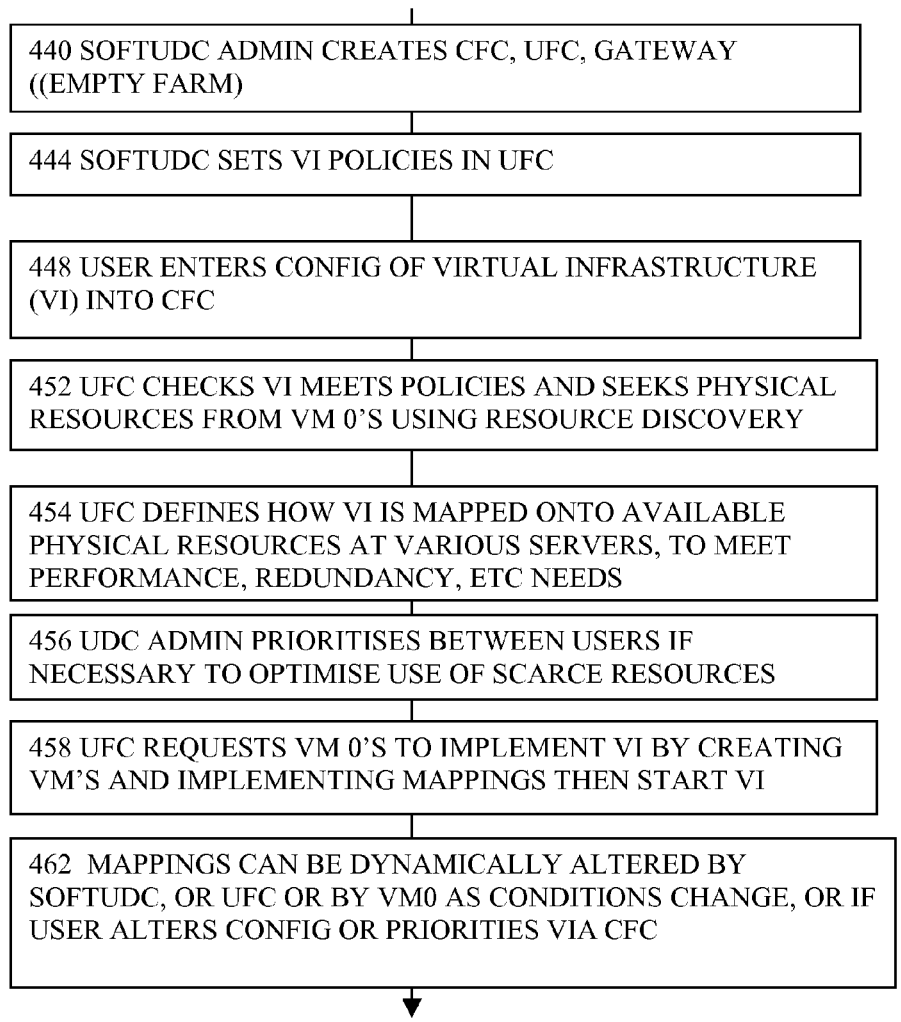

FIG 9  CREATE NEW VIRTUAL INFRASTRUCTURE

440 SOFTUDC ADMIN CREATES CFC, UFC, GATEWAY ((EMPTY FARM)

444 SOFTUDC SETS VI POLICIES IN UFC

448 USER ENTERS CONFIG OF VIRTUAL INFRASTRUCTURE (VI) INTO CFC

452 UFC CHECKS VI MEETS POLICIES AND SEEKS PHYSICAL RESOURCES FROM VM 0'S USING RESOURCE DISCOVERY

454 UFC DEFINES HOW VI IS MAPPED ONTO AVAILABLE PHYSICAL RESOURCES AT VARIOUS SERVERS, TO MEET PERFORMANCE, REDUNDANCY, ETC NEEDS

456 UDC ADMIN PRIORITISES BETWEEN USERS IF NECESSARY TO OPTIMISE USE OF SCARCE RESOURCES

458 UFC REQUESTS VM 0'S TO IMPLEMENT VI BY CREATING VM'S AND IMPLEMENTING MAPPINGS THEN START VI

462  MAPPINGS CAN BE DYNAMICALLY ALTERED BY SOFTUDC, OR UFC OR BY VM0 AS CONDITIONS CHANGE, OR IF USER ALTERS CONFIG OR PRIORITIES VIA CFC

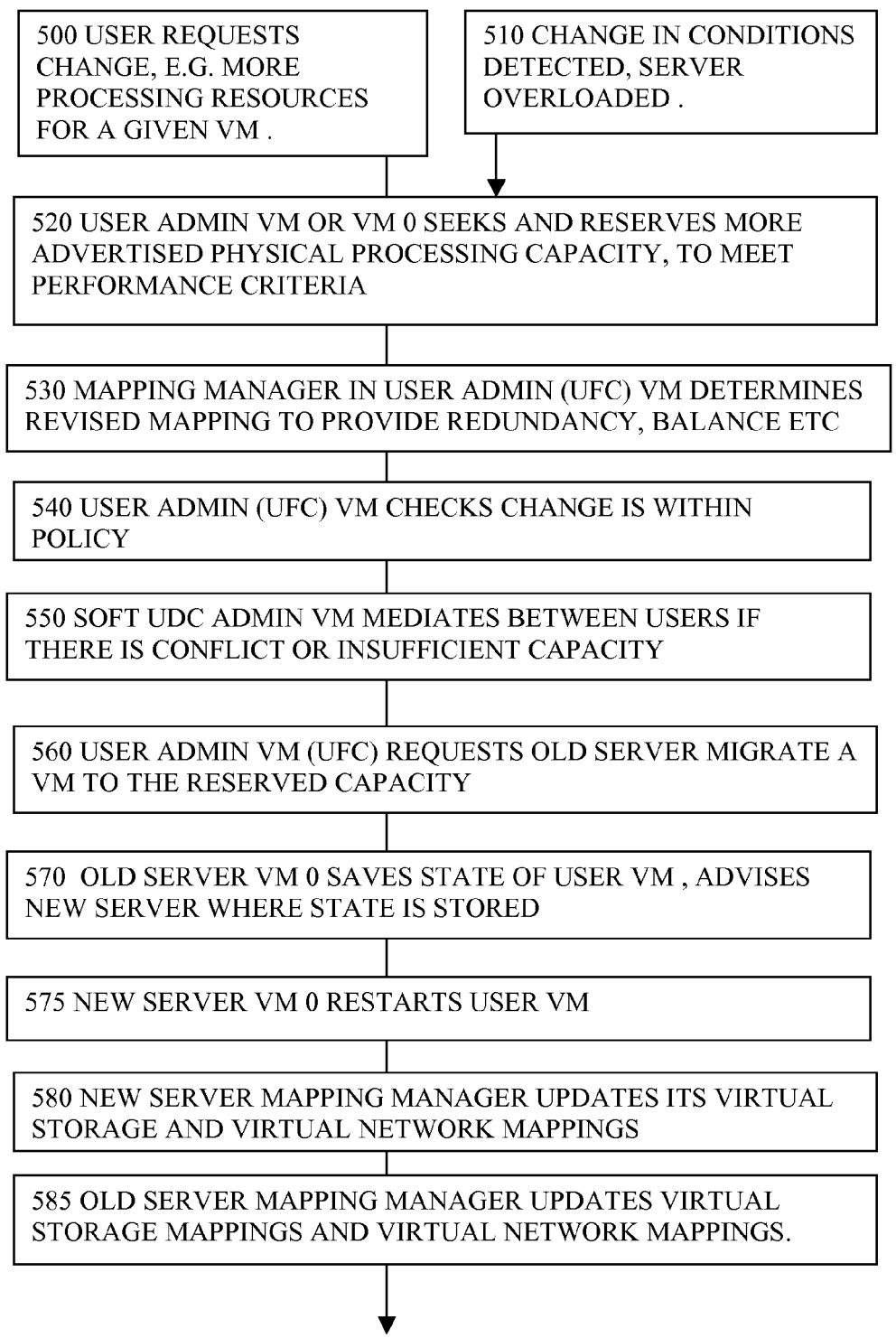

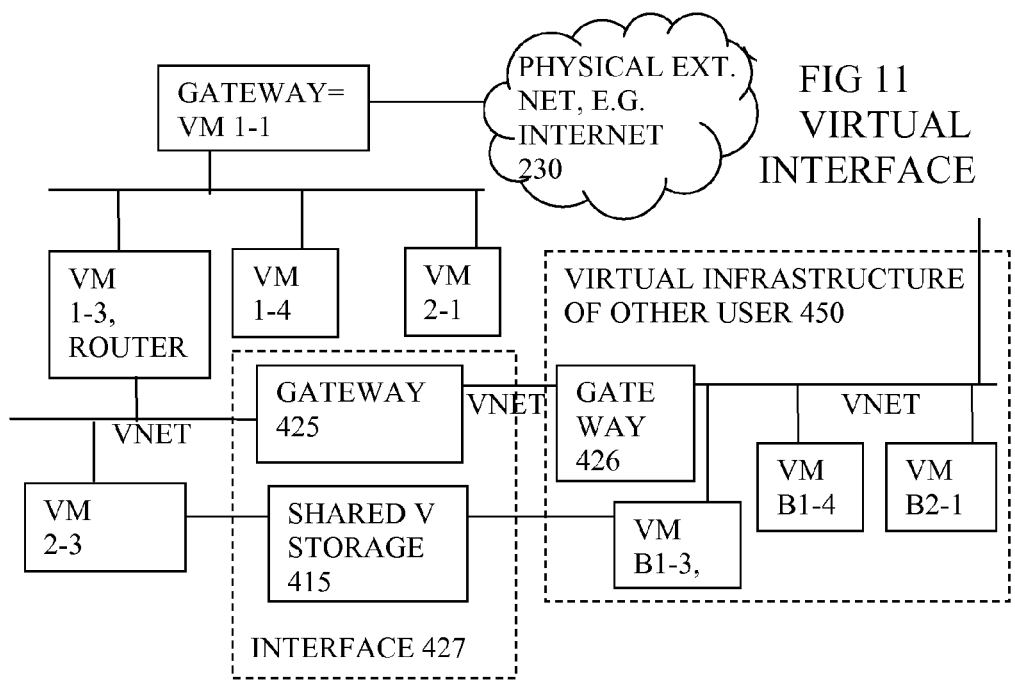
FIG 11 VIRTUAL INTERFACE
FIG 12 PASSIVATE VIRTUAL INFRASTRUCTURE
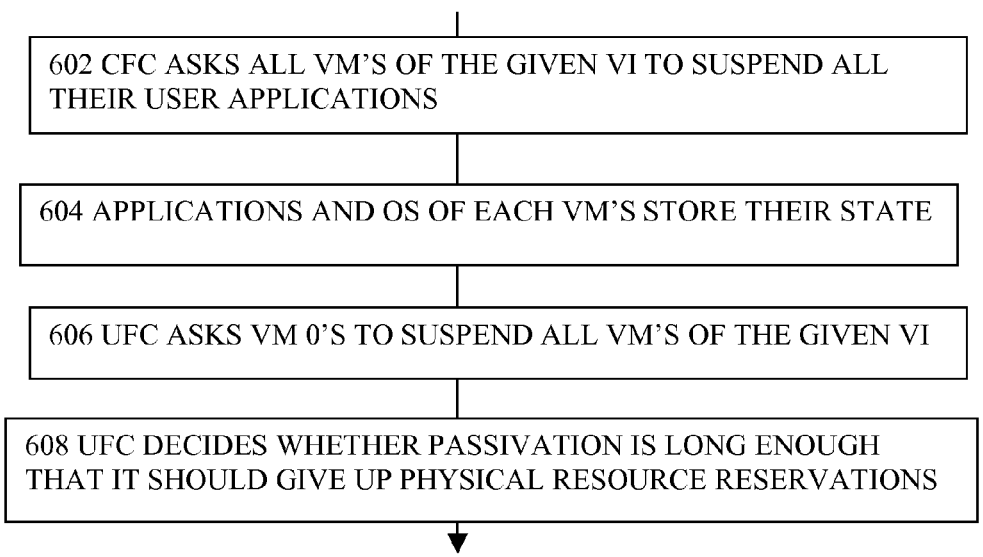

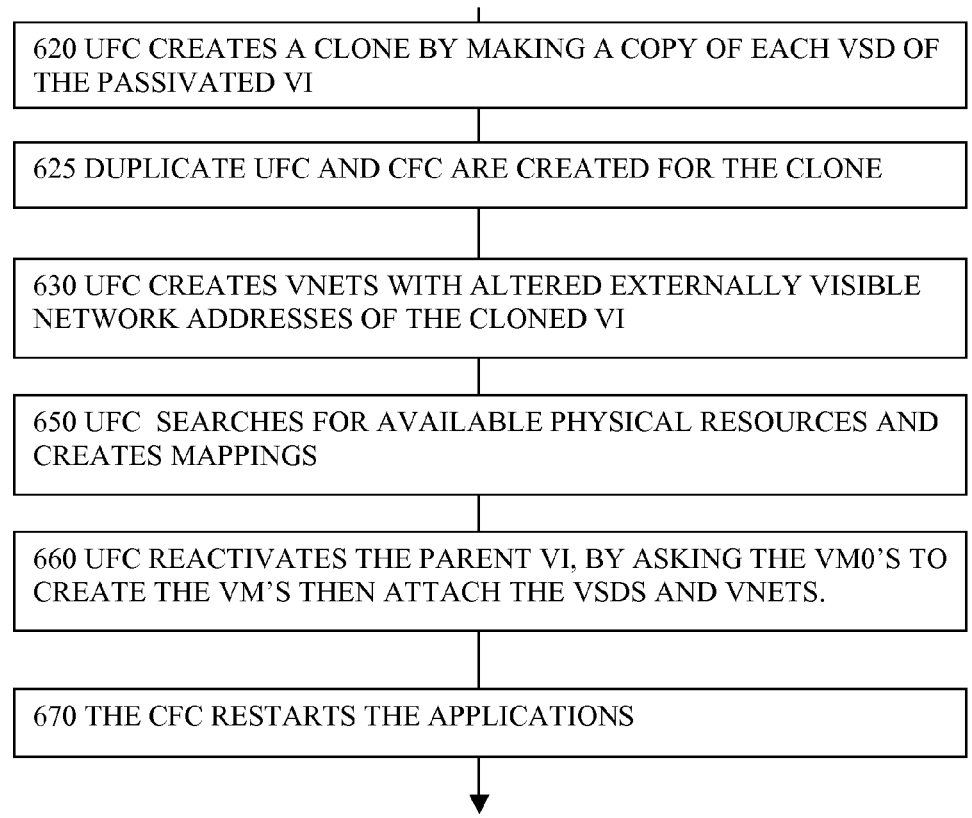

FIG 14 REPLACE PHYSICAL SERVER
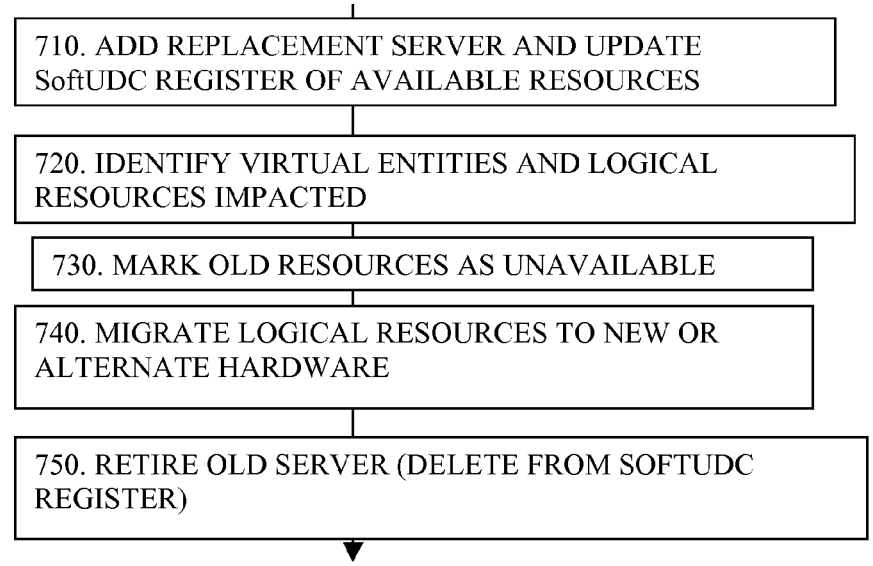
FIG 15 UPGRADE VIRTUAL INFRASTRUCTURE
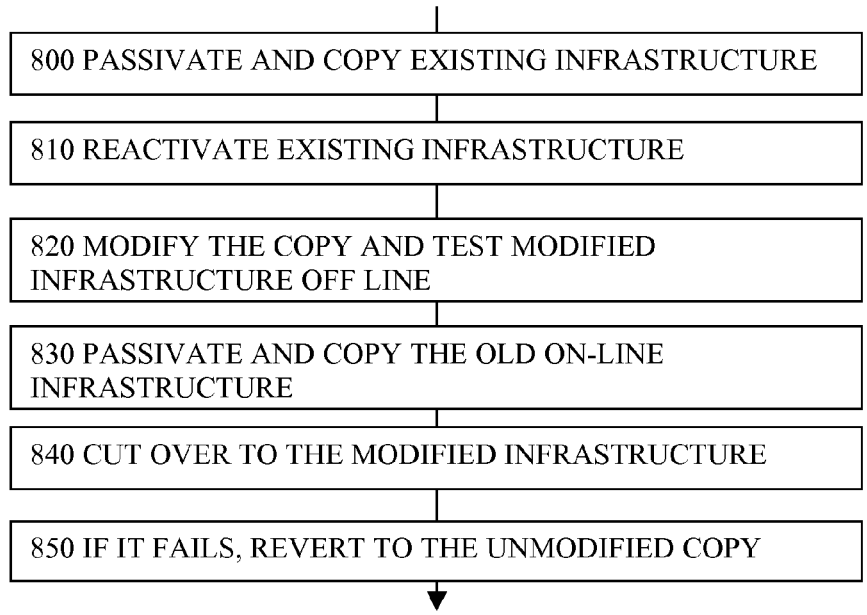

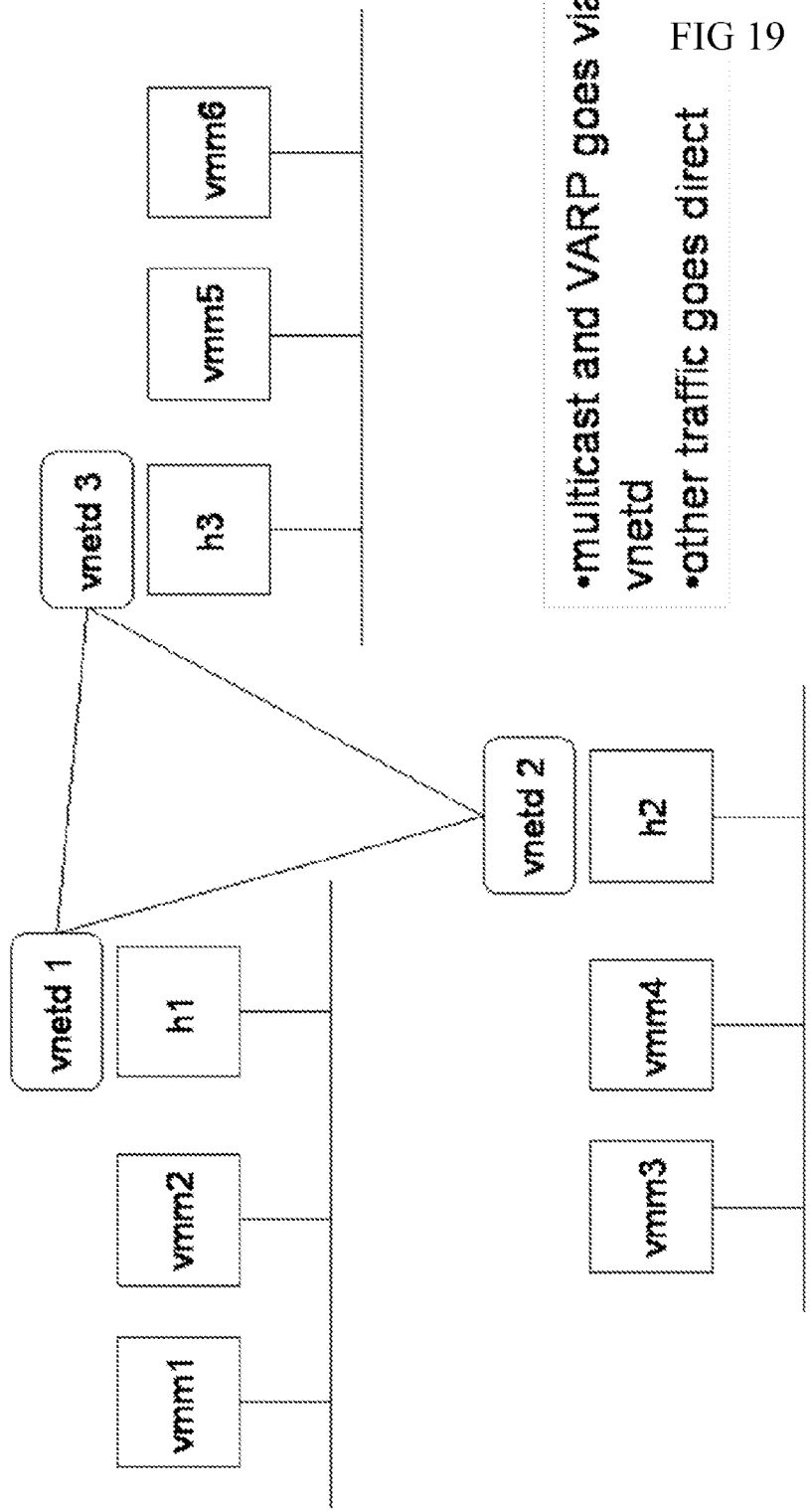

MANAGING VIRTUAL OVERLAY INFRASTRUCTURES

The present application is a National Phase entry based on International Application Number PCT/EP2005/055639, filed Oct. 28, 2005, which in turn corresponds to GB Application Number 0424175.8 filed Oct. 29, 2004, the disclosure of each of which is hereby incorporated by reference herein in its entirety. This application relates to co-pending applications having International Application numbers PCT/EP2005/055640 (entitled "Virtual Computing Infrastructure"), International Application number PCT/EP2005/055642 (entitled "Virtual Computing Infrastructure"), and International Application number PCT/EP2005/055638 (entitled "Virtual Computing Infrastructure"), the US National Phase entries of each of which are filed on the same day as the present application and which are hereby incorporated by reference herein in their entirety.

FIELD OF THE INVENTION

The invention relates to systems having physical resources for data processing and virtual overlay infrastructures mapped onto the physical resources, and to corresponding software and methods.

BACKGROUND

Physical IT (information technology) infrastructures are difficult to manage. Changing the network configuration, adding a new machine or storage device are typically difficult manual tasks. This makes such changes expensive and error prone. It also means that the change can take several hours or days to take place, limiting the rate at which reconfiguration can take place to take account of changing business demands. Sometimes the reconfiguration can take months, as more equipment needs to be ordered before it can be implemented.

A physical IT infrastructure can have only one configuration at any one time. Although this configuration might be suitable for some tasks, it is typically sub-optimal for other tasks. For example, an infrastructure designed for running desktop office applications during the day may not be suitable for running complicated numerical analysis applications during the night. In a single physical IT infrastructure, separate tasks can interfere with each other. For example, it has been proposed to use spare compute cycles on desktops and servers to perform large scale computations: grid applications. The problem is how to isolate the network traffic, the data storage and processing of these computations from other tasks using the same infrastructure. Without isolation undesirable interference between the tasks is likely to occur rendering such sharing an unacceptable risk.

In most physical IT infrastructure, resource utilization is very low: 15% is not an uncommon utilization for a server, 5% for a desktop. This means that customers have purchased far more IT infrastructure than they need. HP's UDC (Utility Data Centre) has been applied commercially and addresses some of these problems, by automatic reconfiguration of physical infrastructure: processing machines, network and storage devices. This requires specialized hardware which makes it expensive. In addition in the UDC a physical machine can only ever be in a single physical infrastructure. This means that all programs running on that physical machine will be exposed to the same networking and storage environment: they can interfere with each other and the configuration may not be optimal for all programs. In UDC although a physical machine can be reassigned to different infrastructure instances, called farms, at different times, it can only be assigned to one farm, at any given moment: it is not possible to share a physical machine between farms. This limits the utilization that levels that can be achieved for the hardware, requiring the customer to purchase more hardware than is necessary.

Overlay networks are known and make it easy to change the network configuration, abstracting devices from the configuration of the real network. However, on their own they do not solve the problem of conveniently adding more storage or machines. Nor do they address the problems of the configuration poor utilization of physical infrastructure. Overlay networks are discussed in the literature, for example see:

Dynamic Internet Overlay Deployment and Management Using the X-Bone., Joe Touch, Computer Networks, July 2001, pp 117-135;

Violin: Virtual Internetworking on Overlay Infrastructure, X. Jiang, D. Xu, Purdue University Department of Computer Science, CS Technical Report CSD TR 03-027, Purdue University, July 2003.

Storage virtualisation is also known. There are many commercial storage virtualization products on the market from HP, IBM, EMC and others. These products are focused on managing the storage available to physical machines and increasing the utilization of storage. Without addition technology they do not solve the problems of how to easily reconfigure the IT infrastructure; the problem of having only one available configuration at any given instance; the problem of low utilization of physical machines.

Virtual machine technology is a known mechanism to run operating system instances on one physical machine independently of other operating system instances. It is known, within a single physical machine, to have two virtual machines connected by a virtual network on this machine. VMWARE is a known example of virtual machine technology, and can provide isolated environments for different operating system instances running on the same physical machine. However, each operating system instance running under VMWARE will see the same networking environment, in other words, the same single infrastructure configuration (where infrastructure means arrangement of processing, storage and network resources). This means isolation is insufficient for running grid applications to consume spare compute cycles: the networking can interfere.

The term "virtual" usually means the opposite of real or physical, and is used where there is a level of indirection, or some mediation between the resource user and the physical resource.

SUMMARY OF THE INVENTION

An object is to provide improved apparatus or methods. In one aspect the invention provides a system having physical resources for data processing, for data storage resources and for network communications to couple the data processing and data storage resources, the system also having one or more virtual overlay infrastructures mapped onto the physical resources, each virtual overlay infrastructure comprising one or more virtual entities for data processing, one or more virtual data storage entities and one or more virtual network entities arranged to couple others of the virtual entities, the system having a mapping manager arranged to dynamically alter the mapping.

The use of a virtual overlay infrastructure provides independence from the underlying physical configuration, which has advantages for upgradeability, for physical resource utilisation, reconfigurability, performance of the applications and for security. This can overcome some of the disadvantages of the known arrangements which virtualize only some of the entities. The mapping being altered dynamically has a number of advantages over a predetermined mapping. It can be optimized as business priorities change, or as conditions of the underlying physical resources change for example.

An additional feature is a number of separate virtual overlay infrastructures each isolated from others, but sharing common physical resources.

Another additional feature is the mapping manager being arranged to alter the mapping according to a policy on availability. This can help ensure the mapping does not leave critical applications dependent on a physical resource with a single point of failure for example. The policy could specify that a back up virtual entity is mapped to a different physical identity, to ensure a given standard of availability.

Another such additional feature is the mapping manager being arranged to alter the mapping according to a performance criteria. This could specify for example that if a performance standard is not met, then an alteration in the mapping will be triggered to improve performance.

Another such additional feature is the mapping manager being arranged to alter the mapping according to a resource utilisation criteria. This could involve altering the mapping if it is determined that a physical resource such as a server or a storage disc is underused.

Another such additional feature is the mapping manager being distributed across a number of entities on different physical servers arranged to cooperate with each other.

Another such additional feature is part of the distributed mapping manager being implemented by an entity for managing all virtual entities mapped to one server. This is useful for optimising or balancing the usage of the server.

Another such additional feature is part of the distributed mapping manager being implemented by an entity for enabling a user to configure the virtual infrastructure. This is useful for optimising or balancing the use of resources by different parts of the virtual infrastructure.

Another such additional feature is part of the distributed mapping manager being implemented by a system administration entity for coordinating the physical resources and mediating between different virtual infrastructures. This is useful for balancing or optimising across different physical resources and different virtual infrastructures.

The system further comprises monitors to monitor the virtual entities and alert the mapping manager, to enable it to balance demands on the physical resources.

Another such additional feature is the management entities being arranged to passivate the overlay infrastructure. This is useful for many purposes, including maintenance, upgrading, easing pressure on overloaded processing or network resources, or adding new physical resources for example. The management of such tasks can be eased by the ability to carry out operations on the infrastructure as a whole, rather than as components.

Another such additional feature is the management entities being arranged to create a new infrastructure overlay according to a policy.

Another additional feature is the entity for configuration of the virtual infrastructure having a user accessible virtual machine and a non user accessible virtual machine, arranged so that the user accessible virtual machine does not access the mapping. This can allow users to manage their overlay infrastructure, including creating and altering their infrastructure or infrastructures. This can ease system administration, while maintaining security by limiting access to the mapping, otherwise other users could be affected.

In another aspect, claiming priority from UK application number 0424175.8 titled "Network Virtualisation", the invention provides a computer network comprising at least a first and second physical server, a plurality of virtual machines running on the first and second physical servers whereby at least one of the virtual machines runs on the first physical server and at least another one of the virtual machines runs on the second physical server, wherein the virtual machines are adapted to exchange information over a virtual network segment on which arbitrary IP and MAC addresses can be used. Users thus receive the impression of a virtual private local area network.

Advantageously, a single virtual machine can be homed on multiple virtual network segments. This allows for virtual firewalls to be established between virtual network segments.

This arrangement allows for development of an adaptive IT infrastructure. It assists in enabling physical resources to be added and removed and resources reallocated without rewiring, and generally allows for flexible use of computational resources.

A second aspect provides a system having physical resources for data processing, for data storage resources and for network communications to couple the data processing and data storage resources, the system also having two or more virtual overlay infrastructures mapped onto the physical resources, each virtual overlay infrastructure comprising one or more virtual entities for data processing, one or more virtual data storage entities and one or more virtual network entities arranged to couple others of the virtual entities, the overlay infrastructures being isolated from each other, and having an inter-infrastructure interface for providing a controlled interaction between different ones of the isolated virtual overlay infrastructures.

An advantage is enabling for example controlled sharing of information with business partners, or between departments. It helps allow the security advantages of isolation of infrastructures to be maintained, while allowing easier cooperation. The isolation can encompass data isolation, meaning no data can flow between them by any direct means, and/or performance isolation, meaning each virtual overlay infrastructure cannot adversely affect the performance of another, in terms of the ability to deliver a useful service.

An additional feature is the interface comprising a gateway virtual machine to allow communication between virtual machines in the different virtual infrastructures according to an interface policy.

Another such additional feature is the gateway being coupled between virtual networks in the different infrastructures. This can enable a number of different virtual entities to use the gateway. This can involve creating a dedicated VNET In the simplest form there could just be a gateway with two interfaces: one each on an existing VNET of each existing virtual overlay infrastructure. Either or neither of the VIs could own this gateway and be able to set policy. If neither, it might be the SoftUDC admin function. Another example is the gateway comprising a gateway virtual machine for each of the two virtual overlay infrastructures, and a dedicated VNET between them. One interfaces of each gateway is on the shared VNET, the other is on one of its own VNETs. The owner of each virtual overlay infrastructure can then set the policies that they see fit on their own gateways.

Another additional feature is the gateway comprising a virtual firewall. This is a convenient way of controlling access.

Another such additional feature is the interface comprising a shared virtual storage entity. This can ease security concerns, if access is limited to storage, so that neither infrastructure can alter nor see entities in the other infrastructure for example. It can be simpler to implement and maintain than other techniques such as using a gateway.

Another such additional feature is the shared storage being read only for all but one of the different infrastructures. This can ease data management issues, if the shared data is controlled entirely by one of the virtual infrastructures.

Another such additional feature is the physical resources comprising a number of servers, each configured to run a number of virtual machines, and run a storage manager (VVM).

Another additional feature is the storage manager being arranged to handle access requests from any of the virtual machines to the shared virtual storage, and depending on the mapping of the virtual shared storage, pass the access request to a storage manager on another of the servers. The storage manager can check the access request meets the interface policy, such as read only requirements, or memory size or addressing requirements for example. The storage manager (VVM) can be implemented so that it cannot be bypassed, e.g. using a VM0 and VMM, as will be described below.

A third aspect provides a system having physical resources for data processing, for data storage resources and for network communications to couple the data processing and data storage resources, the system also having one or more virtual overlay infrastructures mapped onto the physical resources, each virtual overlay infrastructure comprising one or more virtual entities for data processing, one or more virtual data storage entities and one or more virtual network entities arranged to couple others of the virtual entities, the system being arranged to passivate any of the virtual overlay infrastructures so as to allow later reactivation.

This is useful for many purposes, including maintenance, upgrading, easing pressure on overloaded processing or network resources, or adding new physical resources for example. The management of such tasks can be eased by the ability to carry out operations on the infrastructure as a whole, rather than as components.

An additional feature is the system being arranged to make a clone by copying the design and any persistent state of the virtual infrastructure. This can enable the clone to be manipulated without affecting the original.

Another additional feature is the virtual infrastructure having an interface to an external network, using externally visible addresses, the system being arranged to provide different externally visible addresses for the clone.

Another additional feature is the virtual infrastructure comprising a number of virtual machines, and the system being arranged to suspend the operation of virtual machines and store their state to passivate the virtual infrastructure.

Another additional feature is the system being arranged to re-activate the passivated infrastructure.

Another additional feature is the system being arranged to revert to a previous state by replacing the stored state with a copy of the previous state, then reactivating the virtual infrastructure using the previous state.

Another such additional feature is the system being arranged to reactivate the cloned virtual infrastructure and run it independently of its parent virtual infrastructure. This can enable the cloned infrastructure to be used for developing and testing upgrades for example.

Another such additional feature is the physical resources comprising a number of servers, and the system having an infrastructure controller arranged to control the passivation on the different servers.

Another such additional feature is an interface between the cloned virtual infrastructure and a virtual infrastructure of another user. This can enable the other user some shared access, and by sharing the clone rather than the parent, a risk to the integrity of the parent virtual infrastructure can be reduced.

A fourth aspect provides a system having physical resources for data processing, for data storage resources and for network communications to couple the data processing and data storage resources, the system also having one or more virtual overlay infrastructures mapped onto the physical resources, each virtual overlay infrastructure comprising one or more virtual entities for data processing, one or more virtual data storage entities and one or more virtual network entities arranged to couple others of the virtual entities, the system having an infrastructure controller for each virtual infrastructure.

An advantage over a centralized single point of control for all infrastructures is that the independence and separation of the infrastructures is easier to ensure. It is less likely that a user of one infrastructure will be able to access or disrupt another infrastructure either by deliberate hacking or inadvertently. This is particularly important when users are sharing the same physical resources.

An additional feature is the infrastructure controller having a user accessible part (CFC) for controlling a configuration of that user's virtual infrastructure, and a user inaccessible part (UFC) able to access the mapping and the physical resources.

An advantage is it can allow users to configure their virtual overlay infrastructure, including creating and altering their infrastructure or infrastructures, though not virtual infrastructures of other users. This can ease system administration, while maintaining security by limiting access to the mapping, otherwise other users could be affected. In other words, better security arises from dividing the infrastructure controller (also called the "farm controller") into two, the UFC (utility farm controller) and the CFC (customer farm controller). The UFC has access to entities on each server which set up and monitor the virtual machines, and map them to physical resources, without giving the user such access. The CFC is user accessible, and enables the user to control configuration of their "farm" and alter priorities, without being allowed access the underlying physical resources which are shared by many users.

Another such additional feature is the user inaccessible part being arranged to enforce a policy limiting the configuration of the infrastructure. This could affect other users if one virtual infrastructure exceeds its limits, so security and independence are better served if this is user inaccessible.

Another such additional feature is the infrastructure controller being implemented by one or more virtual machines. This helps enable more separation for example with no additional hardware cost.

Another such additional feature is the controller being arranged to monitor applications, running on the virtual infrastructure. This can involve agents on virtual machines for example. This can enable the infrastructure to be controlled to suit the applications. If the applications need more physical resources, this can be arranged by the controller. This use of a controller for each virtual infrastructure makes this simpler to arrange. This can be in the user accessible part of the controller.

Another such additional feature is the user inaccessible part being arranged to control the mapping.

Another such additional feature is the user accessible part having access to some or all of the virtual network entities in the infrastructure. This can assist in debugging and testing by users.

Another such additional feature is the user accessible part being arranged to have access to system management entities including the mapping and the physical resources via the user inaccessible part. This provides a bridge to the management system. The UFC can enforce policy, the CFC makes requests via services running in the UFC to change mappings, add additional resources, etc.

Other aspects encompass parts of the system such as some of the software for the system and methods of using the system. Other advantages will be apparent to those skilled in the art, particularly over other prior art. Any of the additional features can be combined together, and combined with any of the aspects, as would be apparent to those skilled in the art. The embodiments are examples only, the scope is not limited by these examples, and many other examples can be conceived within the scope of the claims.

BRIEF DESCRIPTION OF THE FIGURES

Specific embodiments of the invention will now be described, by way of example, with reference to the accompanying Figures, in which:

FIG. 2 shows a view of physical entities including servers, FIG. 3 shows a view of a server including virtual machines, FIG. 4 shows a view of a virtual machine, FIG. 5 shows a virtual network, FIG. 6 shows a server showing a mapping manager, FIG. 7 shows a flow chart of dynamic mapping, FIG. 8 shows entities involved in managing and creating a virtual infrastructure, FIG. 9 shows a flow chart of creating a new virtual infrastructure, FIG. 10 shows a flow chart of distributed dynamic mapping, FIG. 11 shows a virtual interface to relax isolation between virtual infrastructures, FIG. 12 shows a flow chart of passivating a virtual infrastructure, FIG. 13 shows reactivating a virtual infrastructure, FIG. 14 shows a flow chart of removing a physical server, FIG. 15 shows a flow chart for upgrading a virtual infrastructure.

FIG. 19 shows a wide area virtual network.

DESCRIPTION OF SPECIFIC EMBODIMENTS

Figure 1:
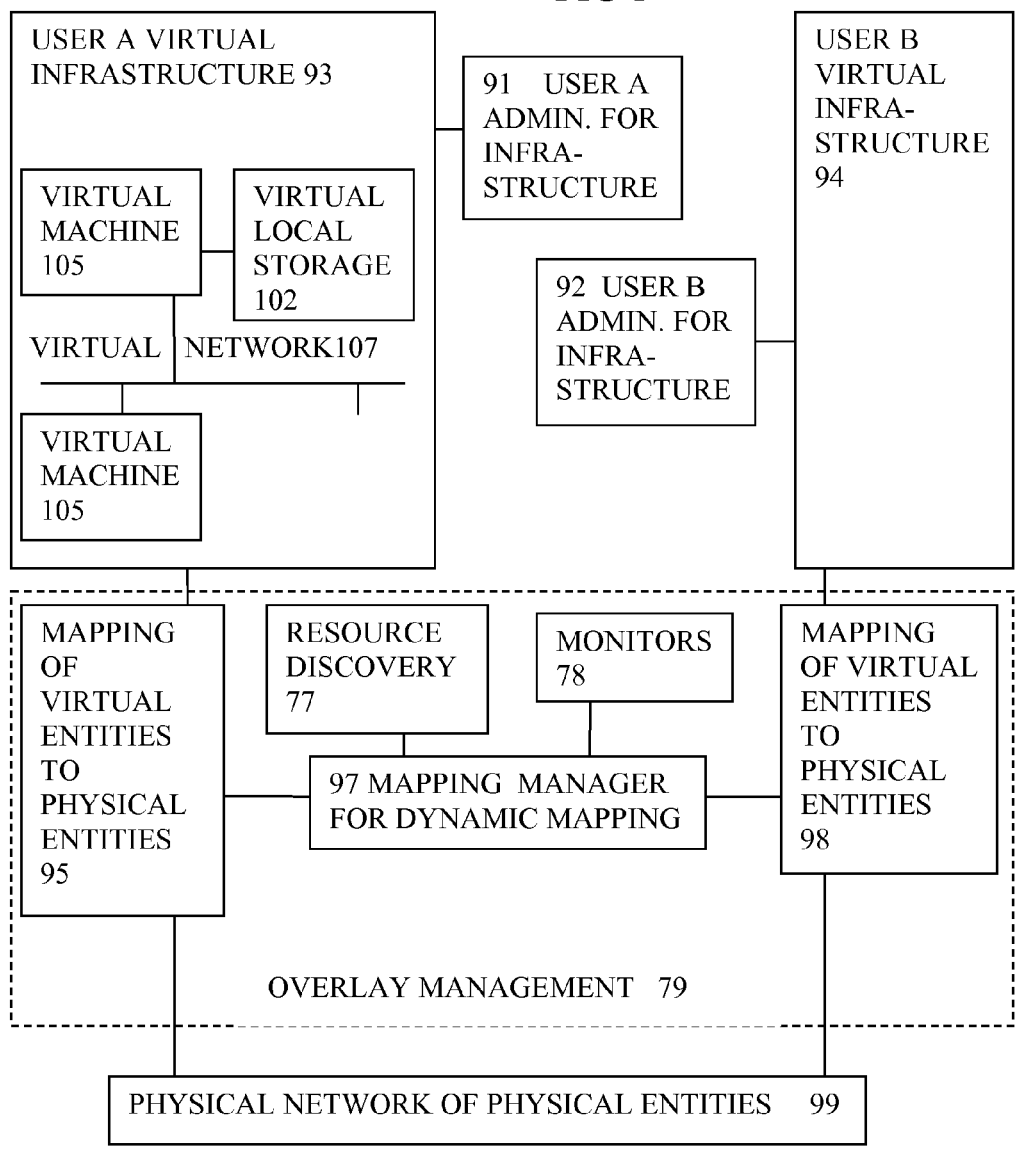
FIG. 1 shows an embodiment showing virtual infrastructures and overlay management.

In the embodiments described, an existing IT infrastructure is dynamically partitioned into a set of virtual IT infrastructures: Overlay Infrastructures. These will be discussed first in general terms.

Overlay Infrastructures

Many different overlay infrastructures may share the same physical hardware resources: network, computers and storage devices. Each overlay is configured independently of other overlays and independently of the underlying hardware configuration. The combined number of virtual resources in all the overlays can far exceed the total number of physical resources in the physical infrastructure. The assignment of physical resources to an overlay is varied dynamically to meet business needs.

An overlay infrastructure is a complete IT infrastructure. Within a overlay infrastructure instances of operating systems run applications. The overlay infrastructure is completely transparent to these operating systems and applications: it is if they were running on a conventional IT infrastructure. They can interact with other applications running in different overlay infrastructures and also applications running in conventional IT infrastructures.

An overlay infrastructure consists of a set of virtual resources: virtual machines, virtual networks and virtual storage devices. The overlay management system configures these to build an IT infrastructure: an overlay infrastructure. To run the overlay infrastructure, the overlay management system maps the virtual resources to physical IT resources: physical machines, networks and storage devices.

A virtual machine is a process running on a virtual machine monitor. Inside the virtual machine is a complete operating system, such as Linux, supporting all the processes that would normally be found in that operating system. A virtual machine monitor can support more than one virtual machine running on a single physical machine. Another name for a virtual machine is a Domain. The term virtual machine is known and there is prior art: VMWARE, IBM 370. However, it should not be confused with the use of the term virtual machine in other contexts: e.g. Java Virtual Machine which has a different meaning. The term "hypervisor" is sometimes used for software that runs on a processor to support virtual machines and the term virtual machine monitor is sometimes used to refer to software that runs on a host OS (e.g. Linux or Windows) and can support virtual machines. In this document, the term virtual machine monitor is used to encompass both these cases, but the embodiments described show primarily the first case.

Many different overlays can share the same set of physical resources. The mapping of the virtual resources to physical resources will vary over time. It will be adapted by the overlay management infrastructure according to a specified policy to match business needs. An overlay can consist of more or less virtual machines than there are physical machines available: many virtual machines from different overlays can share the same physical machine. So the total number of virtual resources in all the overlays can far exceed the number of resources in the physical infrastructure that they are sharing. The overlay management infrastructure ensures that each overlay gets its necessary share of the physical resources to perform its task.

The configuration of an overlay is completely independent of the underlying physical infrastructure. The overlay's networking configuration does not reflect the physical Internet or Intranet configuration: two different virtual machines may be on the same subnet in an overlay when running on different physical machines on different subnets connected by a wide area network. Similarly the overlay's storage configuration does not reflect the underlying configuration of the physical storage or disks available: virtual machines have access to virtual disks. The virtual disks are implemented by storing data on one or more physical disks available in the physical infrastructure: the data from many virtual disks may reside on a single physical disk. The data from a single virtual disk may be stored on multiple physical disks for redundancy and performance.

The configuration of different overlays sharing the same physical infrastructure is independent. Different overlays can have different numbers of virtual machines and virtual disks, and completely different network configurations. Virtual machines can be migrated, in other words they are movable between physical machines e.g on different subnets, even at different locations. Hence each overlay has a logical arrangement of virtual machines coupled by virtual network elements which is orthogonal and independent of the arrangement of physical machines and physical network elements.

An example of such a system is called the SoftUDC, an example of this incorporates a known virtual machine monitor, the Xen virtual machine monitor from the University of Cambridge (described in P Barham et al, "Xen and the Art of Virtualization", in Proceedings of SOSP'03, 2003). A virtual machine monitor allows a physical machine to run many instances of a virtual machine. A separate operating system instance runs inside each virtual machine. Each physical machine in a SoftUDC system runs the Xen virtual machine monitor. SoftUDC adds network virtualization and storage virtualization to the virtual machine functions of Xen.

Server Virtualization

The SoftUDC presents an abstraction of a virtual machine with its own operating system image and its own suite of applications. Each virtual machine exists in a separate protection domain so that virtual machines are isolated from one another to a level comparable to that found in separate physical servers. This means that virtual machines are isolated from operating system crashes, user errors, or transient failures occurring on other virtual machines. Each SoftUDC physical server will be able to support an arbitrary number of virtual machines, subject to availability of sufficient physical resources to provide acceptable performance. Each physical server also runs a management OS in a separate virtual machine that participates in the management and operation of the servers, storage and network infrastructure. All virtual machines, including the ones that run the management OS, run as unprivileged tasks and cannot directly execute privileged instructions. The management OS can use a distinct management API (Application Programming interface) that is accessible directly or through an authenticated and encrypted connection to carry out tasks that require privileged operations.

The management API can provide access to services that create, quiesce and destroy virtual machines and manage the allocation of resources to virtual machines. Managed resources include processors, memory, network bandwidth and I/O bandwidth. Resources may be oversubscribed in that the sum of all resources allocated to all virtual machines may exceed the total resources available on the system, enabling efficient support of applications with resource requirements that are complementary over time.

The virtual machine monitor provides resource measurement and monitoring functions to enable performance monitoring of virtual machines and resource control functions to enable allocation of resources to virtual machines. Resource allocation can be managed to optimize cost, performance, quality of service, power consumption or other factors. Analytical models map user-level or business performance metrics to physical resource management actions so that resource management decisions can produce predictable changes in visible performance characteristics.

In SoftUDC, virtual machines can be migrated from one physical server to another, enabling physical servers to be treated as a single unified pool. Virtual machine migration can be used to acquire resources available on a different physical server or to increase resource utilization by coalescing multiple virtual machines showing modest resource demands on one physical server. It may also be used to free up a particular physical server to enable software or hardware maintenance, or to enable system shutdown to conserve energy.

One of the assumptions of the SoftUDC is that those who have physical access to a machine (e.g., data-center owner) are trusted. Trusted Computing Group (TCG) technology allows this constraint to be relaxed by using a hardware root of trust: the Trusted Platform Module or TPM inside the machine. The TPM enables a party to establish the integrity of a server without interference from the owner. The users can verify that the server is running a particular BIOS and a particular operating system, and that the BIOS and operating system have not been modified. This allows users to protect their data by encryption, independent from the actions and policies of the physical server's owner, such that the owner will not be able to decrypt the data.

Network Virtualization

Network virtualization in SoftUDC is implemented by virtualizing the network connections between virtual machines at the ethernet level. Virtual machines that should appear as though they are on the same LAN segment, or ethernet broadcast domain, are connected together by a 'virtual' LAN segment.

Each virtual LAN segment corresponds to a multipoint ethernet frame tunnel running on top of the physical IP infrastructure. The multipoint tunnels have end points at each physical machine that is running a virtual machine monitor hosting a virtual machine on that particular virtual LAN segment.

Ethernet packets sent out by a virtual machine are encapsulated within IP packets by the virtual machine monitor and directed into the tunnel that matches the particular virtual LAN segment of the virtual machine over the physical network. Various options exist here for optimizing the flow of tunneled packets based on knowledge of which physical virtual machine monitors are hosting which virtual machine network interface MAC addresses.

When a virtual machine monitor receives a network packet over a particular tunnel connection, it decapsulates the packet and passes the original virtual machine's ethernet frame to the appropriate virtual machine that it is hosting on the virtual LAN segment that the tunnel corresponds to. Tunneling ethernet frames over the physical IP infrastructure allows both the overlaying of multiple virtual LAN segments over a single physical LAN segment and also allows a particular virtual LAN segment to span multiple physical LAN segments.

The multipoint tunneled traffic can be encrypted (using IPsec for example) to prevent snooping on the physical network being able to access the network traffic between virtual machines. These virtual LAN segments can be linked together by simply having a virtual machine with multiple network interfaces, each connected to a different virtual LAN segment and performing conventional layer 3 routing between each interface. This allows multi-tier layer 3 virtual networks to be easily assembled.

Storage Virtualization

Storage virtualization abstracts the virtual machine from the configuration of the underlying storage devices: it is as though the virtual machine is connected to a giant storage array comprising of all the disks in a SoftUDC installation. The disks in a SoftUDC installation can include disks that are directly attached to physical machines as well as disks attached to machines by other means such as a SAN. When a virtual machine wishes to access a disk to read or write it, the request is intercepted by the Xen virtual machine monitor. This request is then redirected by the SoftUDC's virtual volume manager VVM to the appropriate target device. The target device may well be attached to another physical machine. The virtual volume manager ensures that a virtual machine can only access the disks for which it is authorized. Virtual storage is also called VSD, and can include storage at disc level, file level, blocks, or any other unit size. There is one Virtual Volume Manager on each physical server. It can deal with a disk I/O access request and either access the real disc or can pass a request to another VVM instance on another physical machine or SAN elsewhere to access the physical disc or memory. An alternative, less sophisticated mechanism would be to omit the VVM and pass requests directly to a storage network such as a SAN which has some level of indirection itself, to provide independence from the physical storage disc. This has some disadvantages, it means local discs cannot be used, and it assumes all servers have access to the SAN and to all parts of the SAN.

In SoftUDC, the virtual volume manager controls the mapping of virtual storage devices VSDs onto the physical storage devices that are part of the shared pool. The mapping is attribute-based: VSD attributes such as required protection level (used to select parameters of RAID storage) and desired performance (used to configure the striping parameters) determine what physical storage devices could be used for a given VSD. Traditionally, server-based storage virtualization only aggregates the network or SAN storage resources to which a server is attached. The virtual volume manager in the SoftUDC can use any storage device in the data center including direct-attached storage (even attached to other servers); it provides the necessary routing and redirection capabilities and uses both the SAN the LAN fabrics for carrying I/O traffic. This enables it to offer performance and availability enhancements that are not possible by other virtualization methods. It can use a larger pool of storage devices for striping, or increasing parallelism; and it can use LAN fabric in addition to the I/O adapters to increase the available I/O bandwidth for a server. It can also provide transparent replication of the virtual storage device contents across multiple storage devices (possibly remote) to increase resilience of the storage system.

A key mechanism used by the virtual volume manager to provide location transparency is data migration. When a virtual machine migrates to other nodes, the virtual volume manager migrates the VSDs as part of the virtual machine configuration. In this form, only the access points for a VSD are migrated, and there are no physical data transfers. In addition to supporting virtual machine migration, this can be used to pass around large amounts of data across virtual machines by changing the mappings of the VSDs. Any data migration is transparent to the virtual machines and can be used for variety of reasons: retiring obsolete storage devices, load balancing, and handling changes in VSD attributes. The data can be accessed while the migration is taking place; the virtual volume manager will limit the slowdown to the application performance using the I/O request throttling. The VSDs used by the virtual machines give the illusion of private storage; however, the virtual volume manager implements the VSD abstraction using shared physical storage devices. While multiplexing workloads onto a shared infrastructure can improve resource utilization, in practice, it is difficult to provide performance isolation for individual workloads. Hence the long-term resource provisioning is unified to provide sufficient resources for the shared workloads and short term I/O request throttling to provide isolation against overloads and transient workload changes. Since the virtualized devices consume additional bandwidth from the LAN fabric and the CPU cycles to execute remote I/Os; the performance isolation also needs to take into account the fabric topology and transient changes in the hardware environment.

Note that there is a mapping of not only virtual machine to physical machine mapping, but also VSD to physical storage mapping. Migration of virtual machines and VSDs might take place as part of a mapping change.

Storage isolation, making VSDs separate from each other, requires enforcement of access controls on VSDs. A VSD should only be accessible to the authorized virtual machines. Note that this does not require that a VSD is exclusively available to one and only one virtual machine. Virtual storage devices can be shared between virtual machines if the designer of the virtual infrastructure requires this. Since the data stored in a virtual storage device travels to and from a virtual machine via the network, enforcement is by authenticating the two virtual volume manager servers at each endpoint, confidentiality is enforced by encryption. Note that this is the same requirement as for network isolation and can implemented using IPSEC.

Management of the Infrastructure

Various arrangements are conceivable. In one example, the management functions are shared between the VMM and a management domain or virtual machine started by the VMM. This can be the first virtual machine on each physical machine running Xen, sometimes called Domain 0, which is privileged: it can manage the creation, configuration and destruction of other virtual machines running on the same instance of Xen. It also configures the VNETs and virtual storage devices available to a other virtual machines sharing the same physical machine. Thus creating an overlay infrastructure involves passing the appropriate configuration information to the Domain 0 instances within a SoftUDC installation.

The mapping of the virtual resources in an overlay infrastructure to the physical resources in the physical IT infrastructure is managed by the VMM and domain 0. It is determined by a mapping of virtual machine to physical machine and virtual disk to one or more physical disks. The mapping (or assignment) needs to be managed to take account of the i/o characteristics and bandwidth availability of the physical infrastructure so that appropriate performance constraints for each overlay infrastructure can be met. For example, two virtual machines on the same VNET may be co-located on the same physical machine, or two different physical machines connected by a high bandwidth link.

The mapping of virtual resources in an overlay infrastructure to physical resources in a physical infrastructure will change over time as business needs require. For example, if the business requires more performance from a particular overlay, the virtual machines might be migrated automatically to more powerful physical machines, possibly dedicating a single physical machine to each virtual machine. This may also involve virtual disk migration between different physical disks. Similarly if less performance is required from a particular overlay, it might be consolidated onto one or two physical machines, or passivated—as will be discussed below. These changes may take place continually during the business day. Soft UDC management can be provided with its own virtual infrastructure, carefully isolated from user access. Domain 0 can set up other domains, each including a virtual machine, and links to virtual memory and virtual network resources.

Advantages and Consequences

Advantages of such virtual overlay infrastructures include the following. They allow multiple different IT infrastructure configurations to be built on a single physical configuration. Each one can be optimized for a particular task or business problem. This is important because each overlay infrastructure can have different properties to suit its requirements—for example different security properties or different performance properties. A numerical analysis overlay infrastructure for example can have a huge network of machines all on a single subnet configured as a large cluster, sharing disks between all the machines. By contrast, a web farm overlay infrastructure can have the usual multi-tiered infrastructure with databases at the backend. Such a multi-tiered architecture is accepted best-practice for security because it prevents normal users having direct access to the database. Another example is a CAD overlay infrastructure with a configuration optimized for running CAD applications. All these overlays with different configurations can share the same physical infrastructure which has only a single physical configuration.

Such overlays can drive up utilization, reducing the amount of IT infrastructure that a customer has to buy. This is because a given physical resource can be shared between many overlays simultaneously, so the overlays are able to provide many more virtual resources than there are physical resources. The overlay management software continuously adapts the mapping of the overlays to physical resources to suit the conditions according to business needs. Different overlays can be given different priorities and allowed to consume a greater amount of physical resources. This allows greater control over the performance of an IT infrastructure and hence the response times that users will see for applications and services that they are using. An overlay infrastructure can be managed as a single entity: saving and cloning; passivating and reactivating; reverting. This can make it easier to create new IT infrastructure—an overlay. It can make it easier to recover from faults—by reverting to a previously operational overlay. Since managing an overlay does not require any manual handling of physical IT infrastructure such as changing a cable, management operations including creation can be fast and automated. Because they are automated they are more likely to be error free than a process requiring manual intervention.

Notable Features

Some of the notable features which will be described below in more detail are as follows.

1. Dynamic and automatic mapping of an overlay infrastructure to the physical infrastructure. This could be driven by business needs. It should be independent of any changes in the virtual infrastructure, but can involve changing where virtual machines are run. It can be regarded as analogous to an operating system for a data center, prioritising between processes in the form of virtual machines, and virtual discs and controlling their access to real physical resources. Infrastructure management can see all other virtual entities or domains and so monitor conditions for overload or under usage, and monitor processing or storage queues.

2. Independence from physical infrastructure configuration: an overlay infrastructure's configuration does not reflect the configuration of the underlying physical infrastructure. For example, the network topology of the overlay infrastructure is likely to be completely different, with different overlays having different configurations.

3. Different overlays may interact with each other via the network or shared access to the same virtual disk. In the case of interaction via the network, it is routed over the Intranet or Internet as normal network traffic. In a similar fashion overlays can interact with entities that are not part of an overlay infrastructure.

4. Other implementations are possible: mixed hardware and software implementations, as described above.

5. The following cover managing a virtual overlay infrastructure as a single entity. This is fundamental to the concept and implementation of overlay infrastructures.

5a. Passivating and re-activating an overlay. Passivating an overlay means stopping all processing activity: suspend or shutdown all virtual machines. At this point the overlay is still available for subsequent activation. However, it is consuming no processing resources, only storage resources. When an overlay is re-activated, the virtual machines are started again, the mapping of the overlay to physical resources may change when it is re-activated.

5b. Saving (or snapshooting) and copying or cloning an overlay are all enabled by the ability to passivate the overlay. Saving an overlay entails copying the design of an overlay and all persistent states to the virtual disks. Typically the virtual machines in an overlay would be shutdown or suspended to allow a consistent snapshot to be taken—see passivating an overlay. The snapshot can then be copied and instantiated to create an exact copy or clone of the overlay: even the MAC addresses of the machines in the two overlays would be the same.

5c. Reverting an overlay, which means stopping all processing activity. The storage resources are then replaced with copies from a previously taken snapshot. When processing activity resumes, it is exactly as if the overlay is resuming from the previous snapshot.

FIGS. 1 2 3 and 4, Hierarchical View of System, Physical Network and Server.

FIG. 1 shows an overall view of an embodiment of a system. Two virtual overlay infrastructures are shown, one 93 for user A and one 94 for user B. Of course many more can be in use, and each user can have more than one. An overlay management layer 79 manages the mappings 95, 98 of the virtual infrastructures to the underlying physical resources in the form of a physical network 99 comprising numerous physical entities. The administration of the virtual infrastructures including configuration of them should be according to user needs, so there is a user A administration function 91 and a user B administration function 92 separated from the underlying overlay management layer.

An example of a simple configuration of the virtual infrastructure for user A is shown, in practice it is likely to be much more complex. A virtual network 107 couples two virtual machines 105. A virtual storage unit 102 is coupled to one of the virtual machines. Each virtual machine can run many user applications as shown in FIG. 4. In principle the virtual storage could be coupled to the virtual network, it makes little difference as they are virtual entities. The overlay management layer can include a number of functions, not all are shown. Each virtual infrastructure has a mapping 95,98 of virtual to physical entities. A mapping manager 97 creates and maintains this mapping, and dynamically alters it to suit changing conditions and in response to requests from the user. The mapping manager makes use of a resource discovery function 77 to find available physical resources for the mappings. Monitors 78 can be used to monitor the virtual entities and/or the physical entities to identify any that are overloaded or underloaded for example.

FIG. 2 shows an overall view of a simple example arrangement of some of the physical entities. In practice there are likely to be many more entities in a more complex arrangement. A physical LAN A couples physical server A 10 and physical server B 20 and a soft UDC administrator terminal 70, to a WAN 30. Another physical LAN B 60 and a storage area network 50 are coupled to the WAN. A user A administrator terminal 80 is coupled to the WAN via the internet 40. Similarly a user B administrator terminal 82 is coupled via the internet 40.

FIG. 3 shows a simplified overall view of a server and some of the functions it carries out. A bottom layer shows conventional physical entities, such as a physical processor 100, physical local storage such as a hard disc 110, and a physical network interface 120 coupled to physical network links. A virtual machine (VM) manager software layer 160 controls a number of virtual machines running on the server. In the example shown, there is user A virtual machine 1-1, user A virtual machine 1-2, and virtual machines 200 of user B. There may be many more. The VM manager 160 includes mappings and entities for managing the mappings, including a storage manager 142. A virtual machine mapping 145 maps the virtual machines to the processing resource, e.g. by defining a time slot in a time shared system, and/or by defining a processor of a multiprocessor system, and perhaps a back up processor, for redundancy. Although an arrow is not shown to every VM, there would be a VM mapping for each VM.

A virtual storage mapping 140 is also provided for each VM, and all are managed by a storage manager 142 (VVM). This can be in the form of a look up table, recording the physical target device corresponding to each logical device attached to a virtual machine, or transferring the request to another server or another location, if the address points to a non local storage device. A virtual network mapping (VNET) 150 is also provided for each VM, to link VMs of one infrastructure to VMs of the same infrastructure located on different servers.

FIG. 4 shows an example of a virtual machine 1-2. Many other configurations are possible. It has a user operating system instance 210, to enable many applications to be run concurrently. The operating system can be linux or any other known operating system. It may be modified slightly to adapt it for use in a virtual infrastructure, to make it run more efficiently on a virtual machine monitor, this is known as paravirtualization, it is a known technique (and published in the literature see reference to Xen paper). The OS is otherwise unaltered and is unaware that it is not dealing directly with the physical entities. Alternatively the OS may not be modified.

Many user applications 220 can be run on the OS and they are likewise unaware of being in a virtual machine, or of the infrastructure being virtual, and having the overlay management entities such as the VMM intervening. The management can be done by VM 0 which has the privilege to invoke the management API provided by the VMM, as discussed in more detail below with reference to FIG. 6.

FIGS. 5, 6 Virtual Infrastructure and Mapping Manager

FIG. 5 shows an example of a configuration of a virtual infrastructure including a number of virtual machines coupled by two virtual networks or vnets. A gateway to an external physical external network 230 such as the internet is also shown. The gateway is implemented as a virtual machine VM 1-1. A first virtual subnet couples the gateway to a series of VMs, VM 1-2, VM 1-3, (a router) VM 1-4 and VM 2-1 (the "2" indicating it is located on a second server). The router couples the first subnet to a second subnet, and to further VMs VM 2-2 and VM 2-3 coupled to the second subnet. FIG. 6 shows another example of a server, and where appropriate the same reference numerals as FIG. 3 have been used. Some of the management functions of the VMM 160 are implemented by a management virtual machine, VM 0. This view also shows how the mapping manager 97 can be implemented across several entities. In this case parts of it are implemented by the VM 0, and parts by a UDC admin portal VM 420, and a user admin VM 430. There is one UDC admin portal for the entire system, and this allows the UDC admin terminal to access and the overlay management layer. It can enable system wide policies to be set, and can mediate between competing demands from users. There is one user admin provided for each infrastructure. It can enable the mappings to be optimized for its own infrastructure. A gateway VM 410 is shown for implementing a gateway to an external network such as the gateway of FIG. 5.

FIGS. 7, 8, Dynamic Mapping

FIG. 7 shows a simplified flow chart of dynamic mapping. At step 300, a change in conditions is detected or a change is requested. This could be a user or a system administrator for example. At step 310, the mapping manger seeks new available physical resources if necessary. At step 320, the mapping manager decides how to alter the mappings depending on the new conditions or new request, and depending on the available resources, and rules about performance, redundancy, user priority and so on. At step 330, the mapping manager changes the mappings for its own server, and at step 340, simultaneously if needed arranges changes on other servers, such as migrating a VM to use available capacity on another server, and updates its own mappings accordingly. At step 350, any vnets coupled to the migrated VM are updated on all servers carrying those vnets.

FIG. 8 shows a view of various entities of the overlay management related to one virtual infrastructure, including an example of an infrastructure controller split into user accessible and user inaccessible parts. A human user A 432 has access via user A terminal 80 and a gateway VM 433 to a controller virtual network. Also coupled to this network are a user A admin VM (CFC) 434, and a utility admin A VM (UFC (436). The UFC is coupled to a management virtual network, which allows access to the VM 0s of each of the servers 1 and 2 used by that infrastructure. A human UDC admin 438 responsible for the whole system has access to this virtual network via a terminal (not shown for clarity), and a UDC admin portal VM 420. As shown, the mapping manager is distributed across the UFC, the UDC admin portal and the VM 0s. The UFC part of the mapping manager can optimise the mapping for its infrastructure, the UDC admin portal can optimise it across the whole system, and the VM 0s can optimise it for their server.

The User A Admin Terminal 80 could access the Gateway VM 434 by a network (intranet or internet). Similarly the Human UDC Admin 438 could access the UDC Admin Portal VM 420 via the Internet/Intranet, and via a proxy running in a the SoftUDC Utility Controller network DMZ.

FIG. 9, Creating New Infrastructure

FIG. 9 shows a flow chart for actions in creating a new virtual infrastructure. Creation of a virtual overlay infrastructure, also called a farm can proceed as follows: First the soft UDC administrator uses the UDC Admin Portal to enable a farm controller to be created. This enables the user to control the creation, according to limits set by policies for the new farm, such as e.g. how many VMs, how much storage e.g. in terms of how many VSDs, where to search first for capacity, limits on address ranges, access privilege limits, and so on. As illustrated at step 440, the softUDC admin creates the farm controller, formed of the CFC, UFC, and the gateway to the user. This creates an empty farm. The softUDC admin sets the policies in the UFC to limit the scope of the virtual infrastructure to be created by the UFC, for example it can limit the number of VMs and amount of storage. At step 448 the user enters the desired configuration of the new virtual infrastructure (VI) into the UFC. The user administrator can access the farm controller to create an overlay configuration or specification such as that shown in FIG. 5. At first this is designed without any mappings. At step 452, the UFC checks the VI meets the policies, and seeks available physical resources from the VMOs to map the virtual entities of the VI. The UFC chooses at step 454 how to map the configuration to the available resources. Generally it will try to use the resources closest to the server running the farm controller (UFC, CFC) and will try to meet performance and redundancy needs for example. The UFC wants to grab suitable resources, for its virtual machines and virtual discs, preferably resources located locally on hardware physically co located, or on same subnet.

The UFC will determine what resources are available and submit reservation requests to the VM 0s associated with such resources. The VM 0s could broker and prioritise such requests in a distributed fashion, but this is typically more efficient if centralized by the UDC admin. Once granted, the VM 0 in each server implements the infrastructure by setting up the new virtual machines, e.g. by booting new instances of an OS such as LINUX. Mappings can be built up, addresses allocated, and virtual storage allocated. It is the management software running in VM0 that sets up the VNETs and boots the new virtual machines. As illustrated at step 456, the soft UDC admin prioritises between various users if there are competing demands owing to scarce resources for example. At step 458 the UFC requests VM0's to implement the VI by creating the VMs and implementing the mappings. This can involve allocating memory mappings and attaching the VMs to vnets. More details of the network virtualisation are set out below with reference to FIGS. 15 and 16. Then the VMs can be started by starting user operating systems, which allows applications to be started. At step 462, the mappings can be dynamically altered by the mapping manager, as conditions change or if requested.

FIG. 10 Dynamic Mapping

FIG. 10 shows a flow chart with an example of the steps involved in dynamic mapping. At 500 a user requests a change. An alternative trigger is shown in 510 where a monitor function, typically implemented in a VM0, detects an overload or excess queue for example. At 520, the mapping manager in the UFC or the VM0 seeks more available capacity. At 530 it determined a revised mapping, according to criteria such as performance and redundancy. At step 540, the UFC checks the revised mapping meets the policies. At step 550, the SoftUDC admin mediates between users if necessary. At 560 if necessary the UFC asks the VM0 to migrate a VM to another server with more available capacity. At 570, the VM0 saves the state of the VM being migrated, and advises the new server VM0 of the location of the stored state. At step 575 the new server VM 0 restarts the migrated VM using the state stored at the given location. At step 580, the mapping manager at the new server updates the storage mappings to attach virtual memory to the new VM, and updates the network mappings to attach the VM to the appropriate vnets. Simultaneously at step 585 the old server updates its mappings.

Once the system is running, dynamic mapping can achieve load balancing, to deal with dynamic workloads and node failures, over-subscribing hardware, and minimizing power use for example. When the SoftUDC notices the load on virtual machines dropping, it migrates virtual machines onto a smaller set of physical nodes to free up physical resources. The resulting idle nodes can then be used to support other virtual machines with high load, or could be turned off to save power.

As load increases, the SoftUDC watches for physical nodes that appear to be close to running out of capacity. It then migrates virtual machines off those nodes to other nodes with spare cycles, powering up nodes as needed. The SoftUDC may also migrate virtual machines in response to a node failure that creates a demand spike on the remaining physical nodes underlying a virtual farm. A similar load balancing strategy is also used to manage the load on the SoftUDC's storage subsystem. Monitoring agents running in the virtual volume manager can detect the load that different virtual machines are posting on different storage components. When they alert their associated VVM or VMM, it can determine if the system can be optimized (say for performance or power) by moving data to different locations, and the virtual volume manager can carry out the data migration transparently to the virtual machines.

An example of how improved redundancy can lead to higher availability will now be discussed. A fail-over cluster to improve availability is currently reserved for the most critical applications and environments due to the high material cost associated with redundant physical infrastructure. With redundancy achieved via virtual infrastructure, the material cost is dramatically reduced. For instance an application server and its standby partner doubles the material cost of the application. If however, both servers are constructed as a virtual overlay, in conjunction with similar fail-over cluster virtual overlays, the physical infrastructure cost is near what it would be minus the fail-over cluster. For example, N two-way fail-over cluster virtual overlays can reside on a physical infrastructure consisting of two machines in the best case—assuming zero processor load per service. Assuming non-zero processor load then the number of machines will have to be adjusted to allow for SLAs (service level agreements) to be met in the face of expected number of failures and expected load, plus some safety factor. If it is assumed each service generates a 15% load, then for N=6 we might need 2 or 3 machines down from 12! For N=10, then 3 machines could be used, down from 20.

Another example of a use of dynamic mapping is to create a safe and manageable grid computing application. An example now follows. A large aerospace company wishes to set up a grid service to use its excess IT capacity to run Computational Fluid Dynamic (CFD) calculations. Using SoftUDC they can create a new overlay infrastructure for running the grid application.

- The architecture of the grid overlay infrastructure (e.g. its networking layout) is optimized for grid usage—it is not constrained by the architecture of the physical network or existing overlay infrastructures.
- The resource usage of the grid overlay is controlled so it cannot interfere with other overlays. In particular the enterprise IT overlay takes priority during the working day. The grid overlay is completely isolated from other overlays including other grid overlays—there can be many grid overlays on the same physical infrastructure.
- The aerospace company may choose to construct an overlay infrastructure to run grid applications specifically for its business partners (see Virtual Organization scenario below).
- Many grid overlays can share the same physical infrastructure, since the physical resource assignment is managed dynamically.

FIG. 11 Interface

In many industries there is a need to share applications and data with business partners. This may necessitate setting up an infrastructure especially for this purpose. This is sometimes called the virtual organization. The security of the infrastructure is vital. Building a separate dedicated infrastructure for this is expensive. In SoftUDC it can be much cheaper. The business partner can be given its own virtual infrastructure, isolated as usual, and then controlled access can be provided between the two otherwise isolated infrastructures. Two ways of implementing an interface for relaxing isolation between infrastructures can be summarised as follows (other variations can be conceived):

1. Create a dedicated VNET and control access via a virtual firewall. In principle this could use a gateway between existing VNETs. In practice it is preferable to create a dedicated VNET with a gateway from each infrastructure onto that VNET, then a user for each farm can set appropriate policies up at their gateway.

2. Share a VSD between to overlays. The shared VSD solution doesn't really require a gateway. It merely requires us to configure the Virtual Volume Manager to attach the VSD to one virtual machine in read-write mode and the other virtual machine in read-only mode. The two virtual machines would be in different overlays. The virtual volume manager is implemented partly in each VMM and partly in the distinguished management VM. It intercepts all disk i/o and routes it to the appropriate VSD. It is not possible for a virtual machine to override the virtual volume manager, because it is embedded in the VMM.

FIG. 11 shows both examples mentioned above. This figure is based on FIG. 5, and corresponding reference numerals have been used as appropriate. A virtual infrastructure 450 of another user (such as a business partner, or other department within the same organisation) is to be coupled to the existing infrastructure. A pair of gateways 425 426 can be provided to couple a vnet of one infrastructure to a vnet of the other. This can be an existing vnet coupling many VMs. A new vnet couples only the two gateways. Alternatively or as well, a shared virtual storage element 415 can be attached to a VM in both infrastructures. In this case, access controls such as read only status for one of the infrastructures could be implemented in the VVM for the shared storage. To set this up, the shared storage or the gateway could be set up by the UDC admin function, or by a UFC of either infrastructure, authorised by the UDC admin function. Then the other of the infrastructures could be modified by its UFC to couple to the gateway or shared storage. The gateway can consist of three components: a gateway in each infrastructure linked to a dedicated VNET. In the shared storage method, because the VVM is running in VM0, in a sense it is the VM0 that is acting as a gateway. This gateway is not visible to the VM's. In the other example the gateway is visible, because the virtual machines must explicitly route their network traffic through the gateways.

An example of an application of a virtual organization will now be explained:

A CAD infrastructure already exists as a virtual overlay infrastructure, and a clone of the relevant part is made to create a new Business Partner (BP) overlay—no new equipment is needed The BP overlay is modified as required by the needs of the interaction—perhaps certain applications are removed.

A firewall is inserted to allow the business partner VPN (Virtual private network) access—This is a "soft" (SoftUDC) firewall, i.e. it is a virtual machine.

Certain disks in the CAD infrastructure are attached in read-only mode to allow the business partner to read, but not modify live data (Note the idea of mounting disks read-only in one overlay and read-write in another is discussed above.

This makes it possible to consider a federated virtual organization which has an overlay infrastructure spanning multiple physical IT organizations. Such a virtual data center can include physical components assembled from different organizations. It could have SoftUDC VNETs to span wide area physical networks and traverse existing firewalls. Typically the Utility Controller would have its own VNET. The Utility Controller consists of the VMOs plus the UFCs and SoftUDC Admin portal. Storage virtualization could involve spanning wide area to allow wide area storage migration.

FIGS. 12, 13 Passivate Virtual Infrastructure and Clone It

A virtual overlay infrastructure is passivated by having each virtual machine in the virtual overlay infrastructure suspended. This is illustrated in FIG. 12. Optionally, the Customer-Farm-Controller may invoke application specific suspend operations in each virtual machine within a farm (step 602). The suspend operations can involve applications and operating systems storing their state (604). Then the Utility-Farm-Controller, Customer-Farm-Controller pair invoke the suspend operation on each virtual machine in the farm (step 606). This is done by passing a "suspend <virtual machine identifier>" to each Domain 0 of every physical machine on which a virtual machine in the farm is running. Note the virtual machines suspended can include network appliances such as firewalls, routers and load balancers.

Once the suspend operations have completed, the virtual overlay infrastructure is passivated: there are no active virtual machines carrying out any processing. All that remains is the persistent state stored in the VSDs. The UFC can decide whether the resource reservations should be maintained (608). Typically if the passivation is temporary then it is not efficient to give up the reserved processing and storage resources which are not used, since it takes time to find and map new resources. A farm is reactivated by having the Utility-Farm-Controller, Customer-Farm-Controller invoke the resume operation on each virtual machine that has previously been suspended. This is done by passing a "resume <virtual machine identifier>" to each Domain 0 running a virtual machine that is in the farm.

As shown in FIG. 13, cloning a virtual overlay infrastructure is by taking a copy (620) of each VSD of a previously passivated virtual overlay infrastructure. Duplicate Customer-Farm-Controller, Utility-Farm-Controller and Gateway are created (625) for the clone farm, as shown in FIG. 9. The clone VI is assigned to the duplicated CFC, UFC.

When the clone is activated, The Customer-Farm-Controller, Utility-Farm-Controller pair (CFC, UFC) create new VNETs (630) that replicate the configuration of the original VNETs: all network masks, gateways etc. are identical, only the VNET identifier is different to the original. Finally the UFC locates available physical resources using a discovery service which maintains a register of available resources. The UFC can then select mappings of VMs to physical servers (650) and ask the chosen servers to create duplicate virtual machines: one for each virtual machine that was in the farm. The duplicate virtual machine has the appropriate VSD attached to it and is created with exactly the same parameters as the original virtual machine (660). The applications can be restarted by the CFC (670).

Network isolation of VNETs, means that the virtual machines in the original and clone can have the same MAC addresses and IP addresses. The only restriction is for addresses that are externally routable: visible outside of the virtual overlay infrastructure. In SoftUDC, internal addresses are normally non internet routable addresses, such as 10.*.*.* or 192.168.*.*. Normally the Gateway performs network address translation to translate between an externally visible address and the internal addresses used within the virtual overlay infrastructure. The externally routable addresses for each virtual overlay infrastructure need to be unique, so the Gateway for the clone will use a different set of externally visible addresses. If a virtual overlay infrastructure only uses externally visible addresses throughout, so that a gateway performing Network Address Translation is unnecessary, then it cannot be cloned. Cloning such a virtual overlay infrastructure would result in machines with duplicate IP addresses and MAC addresses being visible in the same network: the clone and the original.

Reverting a virtual overlay infrastructure uses a combination of the mechanisms described above. Prior to reverting a snapshot of the overlay has to be taken. A snapshot is taken by passivating the overlay and taking copies of all VSDs. In addition a copy of the current design of the farm is taken. To revert a virtual overlay infrastructure, the current version is shutdown and discarded: all virtual machines are shutdown, all VSDs are destroyed. A clone is then created using the previously saved snapshot. Note that passivating the virtual overlay infrastructure seems to be a necessary part of snapshotting and cloning. If VSDs were copied from a virtual overlay in which active processing was taking place, the copies would likely contain inconsistencies.

Compared to known notions of passivating and reactivating a farm of physical machines, such a farm could not be reactivated if any of the physical machines were already in use. Also they would have to be reactivated on the same physical machines, so it is not possible to create a clone. In addition, if the reactivated farm was not reactivated on the same physical machines, then certain software may be able to detect the reactivation by noticing the difference such as change of MAC addresses. VMWARE has support for suspending and resuming individual virtual machines, but no notion of virtual overlay infrastructures, nor of suspending and resuming a set of virtual machines in a consistent state. Neither HP UDC nor VMWARE provide support for cloning a virtual overlay infrastructure or reverting it to a previously saved state. VMWARE does have a notion of reverting an individual virtual machine, but there is no notion of reverting a set of virtual machines into a consistent state. Cloning needs care with inputs and outputs, and information needs to be separable into the parts which are inherent to the design, and which parts are the results of implementation, e.g. the contents of registers and storage, the states of virtual machines, values of variables and so on.

FIG. 14 Replace Physical Server

FIG. 14 shows an overview of some of the steps involved in removing a physical server, e.g. for maintenance or other purposes. At step 710 a replacement server is added to the network first, if there are not sufficient resources already existing. This is registered as providing available resources so that a discovery service can find it. At step 720, the VM 0 will identify all the virtual infrastructures affected by the proposed removal, and will alert the UFCs for each of them. At step 730 the VM0 will mark its resources as unavailable, to prevent any resources on this server being reserved and so prevent any new VMs being created. The UFCs will then migrate the their VMs to other servers (step 740). The VM 0 can monitor when this has been completed. At step 750, the server can be shut down and deleted from the register of physical resources.

Another possible implementation would be for the VM0 to find replacement physical resources for anything that it is hosting.

If a server suffers a complete unexpected failure, the UFCs affected can detect this and allow a "fail over" operation to replace the lost VMs from backup copies. This could be done autonomously if the VMs are set up as redundant pairs on different servers for example. Many other back up schemes are possible following established principles.

FIG. 15 Upgrade Virtual Infrastructure

This is a useful application of the capabilities of Passivating, Reactivating, Cloning and Reverting a Virtual Overlay Infrastructure. The IT department performs an upgrade as follows. By running the CAD farm as an overlay infrastructure in the SoftUDC, the IT department is able to clone it (800)—Clone in this context means replicate the disks, VNETS and other overlay infrastructure configuration. There may have to be some manual "passivating" of applications, similar to what might happen for backup. This means IP addresses, MAC addresses will be the same in both the original and the clone. Normally this would cause terrible networking problems. In SoftUDC this is not a problem, because the two overlay infrastructures are totally isolated from each other. The parent virtual infrastructure is reactivated (810).

The cloned infrastructure is upgraded (820): patched and new versions of applications are installed. The IT department then tests it. This is done via private VPNs: the upgraded infrastructure cannot leak onto the corporate intranet or into other overlays. Instead the upgraded infrastructure is plugged into the testers desktop via a SoftUDC VNET VPN. (NB this is similar to the NSA's NetTop architecture in which virtual machines are used to allow secure access to networks of different sensitivities from a single desktop. Traffic flows between the networks are prevented or strictly controlled.)

When the IT department is happy with the new infrastructure, they cut over to it. Optionally a copy of the existing infrastructure is taken (830) first. The cut over (840) is done by changing the configuration of the external gateways of the new and old farms: all SoftUDCs farms have gateways that connect the farm to the Internet or corporate intranet backbone. Data synchronization between the two instances before making the clone live can be a manual process. If the upgrade turns out to be bad, the IT department can revert to the old infrastructure (850) by reactivating it and switching the gateway configurations back.

Many developers and testers require access to networks of machines for testing and development e.g. web services developers: some use VMWARE (performance is limited as it is all on a single physical machine), others use networks of physical machines (costly—acquisition cost, maintenance/patching cost). Using SoftUDC, developers are provided with their own private overlay infrastructure. CPU and bandwidth usage policies ensure the developer gets fair access to the physical resources and does not lock-out others. As computational demands change the mapping of the overlay infrastructure to physical infrastructure is changed to ensure maximum efficiency. The SoftUDC VNET technology ensures there is no leakage between the developer's overlay and other overlay infrastructures. The developer's overlay is plugged into his/her desktop via a SoftUDC VNET VPN.—NB this is similar to the NSA's NetTop architecture—see the upgrade scenario.

Developer and testers can snapshot their infrastructures so that they can revert to known good states later. Depending on the type of development the infrastructure might be made the live infrastructure once it is ready: see the upgrade scenario. If the output is a bunch of bits to be burnt onto a CD, then this step would not be appropriate.

Another use of clones is for monitoring of operation of a virtual overlay infrastructure or components of it. A clone can be created of all or part of the virtual overlay infrastructure or infrastructures. Then the replicated infrastructures are exercised with realistic operations to generate notions of correct behaviour. For example in relation to network-based behaviour, this can be achieved with reference to, for example patterns of network traffic; and in relation to host-based behaviour, with reference, for example to frequency of system calls to particular addresses. Observations of the behaviour over time can then be summarised in a signature using known techniques. The signature can then be used as a reference to detect possible attacks or incorrect behaviours in the live infrastructure. An advantage of creating the signature from the clone rather than the live infrastructure is speed. Time scales can be compressed for the clone. Also, abnormal behaviour can be simulated safely on the clone to make the signature represent such behaviour, or to test whether the comparison to the signature successfully discriminates such abnormal behaviour.

A typical signature can include files of hosts typically used, typical frequency of use, and rules or thresholds relating to accesses of such hosts. Standard "sniffing" tools can be used to monitor activity in the live infrastructure, and this activity can then be compared to thresholds contained in or derived from the signature, to detect for example too many messages being sent to a previously unused port, or too many outbound messages to a new location. In a minimal case one could just replicate a single virtual machine, but more could be cloned, up to an entire new infrastructure. The clone could be used not only for creating the signature, In most cases, passivation would be carried out before cloning, but in some instances of replication of parts, passivation may not be needed, such as where databases have built in assistance to allow replication without passivation. This can involve cloning the logs and the committed data. So a clone of such a system can be built by replicating the base configuration of the operating system and then instantiating the "cloned" database on top of it.

Figure 16:
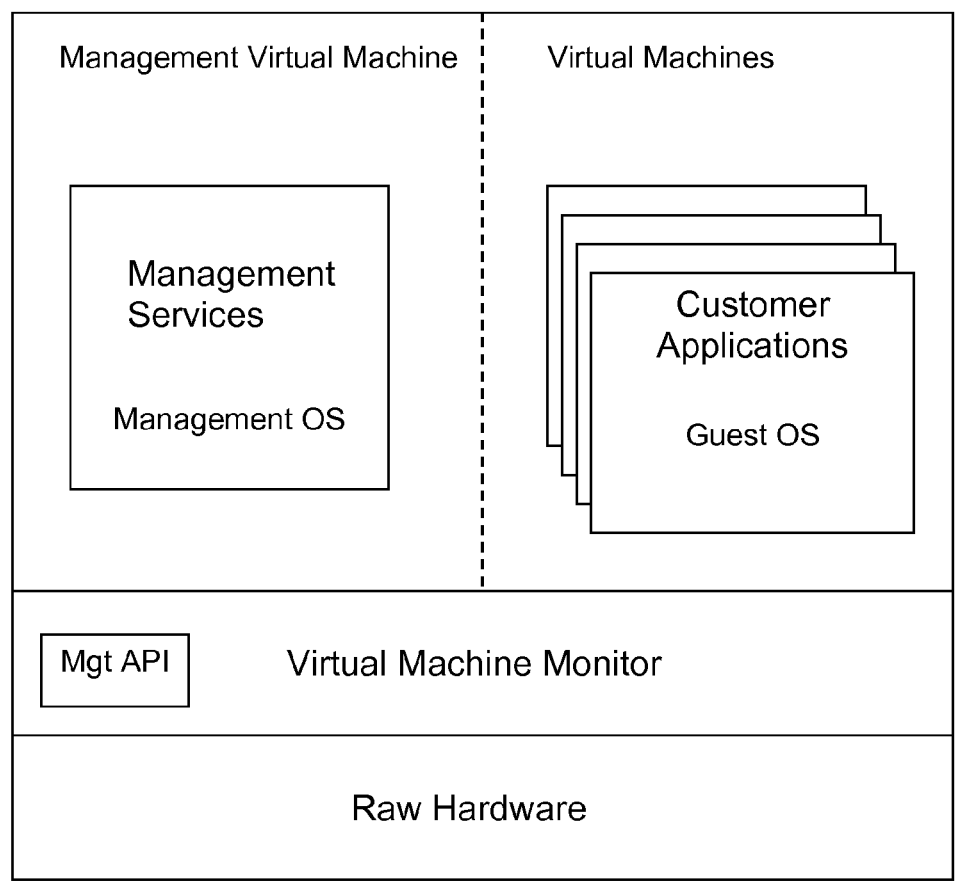
FIG. 16 shows SoftUDC implementation with a distinguished virtual machine used to host a management OS.

FIG. 16 Server Example,

As discussed above, embodiments of virtual networks are advantageously used in a software-based adaptive IT infrastructure. SoftUDC abstracts the physical infrastructure of the data center, allowing resources to be shared among disparate services, and enabling reconfiguration without rewiring. Another view of an example of a SoftUDC system is shown in FIG. 16, each server having a virtual machine monitor (VMM). This layer provides the abstraction of multiple virtual machines running on each physical machine. Each virtual machine sees an abstract view of its storage and network. The VMMs on different nodes can connect virtual machines into virtual farms, and ensure that the virtual farms are isolated from each other. A virtual farm then consists of a set of virtual machines, networks and associated storage. An administrator has access to a SoftUDC control system spanning all the VMMs, the control system allowing the administrator to deploy services and modify virtual farms without need for physical reconfiguration of physical infrastructure. Administrative tasks such as allocating and configuring farms, deploying new applications, rebalancing loads in the system, and performing system maintenance, are automated. The term "virtual farm" is used to mean a virtual overlay infrastructure: a set of virtual machines, connected to a set of virtual networks and associated virtual storage.

The SoftUDC adds a virtualizing layer to the VMM on each server, also called the gatekeeper, which specifically mediates all I/O and network traffic generated by the server. The gatekeeper enforces communications access control and provides communications security. Such a gatekeeper can be implemented in hardware, in the VMM or in the host operating system. In a preferred implementation, the Xen VMM is used as the VMM and components of the gatekeeper are implemented in the VMM and the first virtual machine (which has special privileges in Xen). FIG. 16 shows an example of the SoftUDC software stack on a server, including the gatekeeper in the form of the components of the VMM and management OS that mediate the network and storage I/O traffic.

Figure 17:
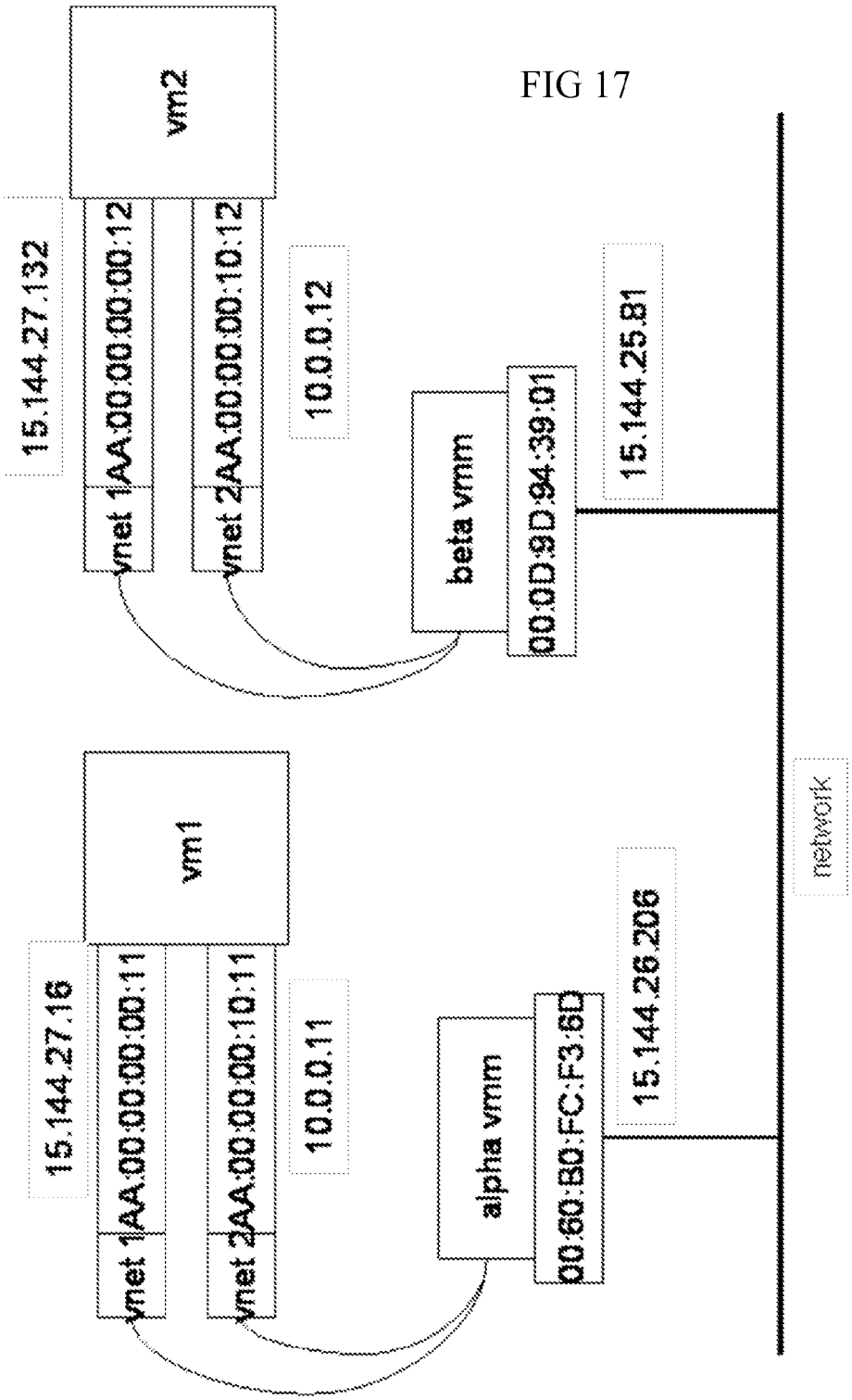
FIG. 17 shows a physical network configuration.
Figure 18:
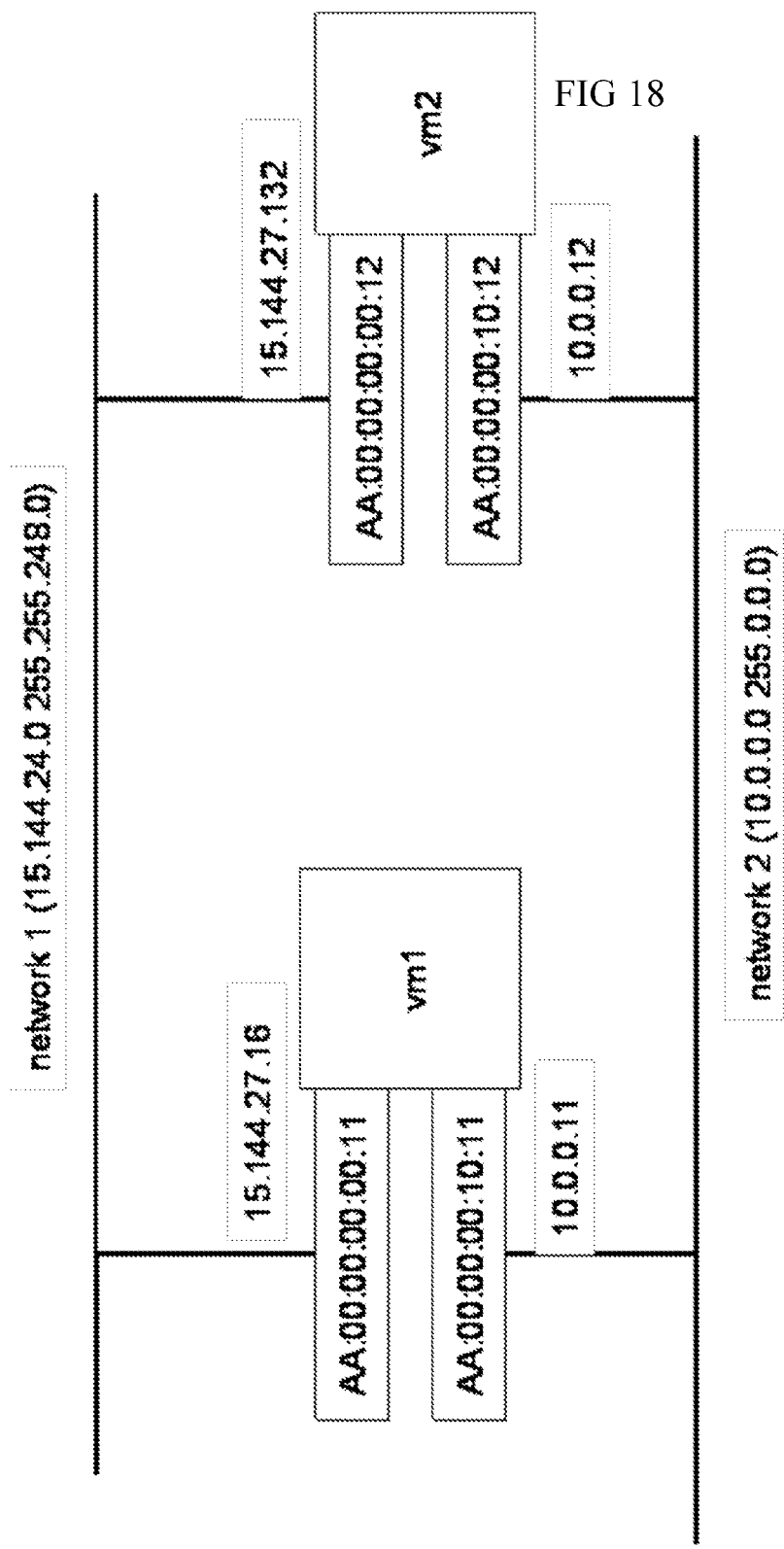
FIG. 18 shows a virtual network configuration for the physical network configuration of FIG. 16.

FIGS. 17-19, Network Virtualization

The aim of network virtualization in this context is to provide users with the impression that they have their own virtual private LAN, known as a VNET, within which they are free to use any MAC or IP addresses they want. VNETs are preferably required to provide security at least as good as that provided by a hardware VLAN. VNETs should be decoupled from the underlying network topology, and should maintain network connectivity when virtual machines migrate from one machine to another.

The virtual machine's access to networking is done by providing the virtual machine with a virtual network interface (VIF), usually appearing to be an Ethernet device. The VMM forwards outbound network packets to its physical network interface and dispatches incoming network packets to appropriate virtual network interfaces. With this implementation, virtual machines needing off-machine networking use the physical network, and their VIFs must have MAC addresses and IP addresses suitable for this. Machines on the physical network can observe virtual machine packets in transit.

VNETs are implemented by labelling a VIF with the VNET that it belongs to. Outbound Ethernet traffic destined for a VNET is encapsulated in an IP packet using Etherip and forwarded to the network. Inbound Etherip traffic is decapsulated to produce an Ethernet frame, which is delivered to VIFs on its VNET. The VNET id of a packet is stored in a field of the Etherip header for transport across the network. Some VIFs require direct access to the physical network, and VNET id 1 is reserved for this. Traffic on VNET 1 is delivered to the network without encapsulation, and uses the VIF MAC.

Encapsulated VNET traffic has to be directed to a suitable IP address, the care-of address (COA). This is done based on the destination MAC address of the Ethernet frame and the VNET. If the MAC is a broadcast or multicast address, the COA is the local VNET multicast address (default 254.10.0.1). If the MAC is a unicast address, the COA is the real IP address of the machine hosting the addressed virtual interface. Care-of addresses for VIFs are discovered using a protocol designed for the purpose, the Virtual Address Resolution Protocol (VARP). VARP is modelled on ARP—VARP requests are broadcast or multicast, with unicast responses.

As VARP learns where VIFs are, migration does not cause it any particular difficulty. When a virtual machine migrates the care-of addresses of all its VIFs change, so we broadcast a VARP reply for all the VIFs. This updates the VARP caches of any systems communicating with it, and maintains network connectivity.

In SoftUDC, network isolation is implemented using VNETs: the VMM encapsulates the packet and sends it to another VMM or a virtual router on the same VNET. The receiving VMM unwraps the packet and delivers it to the target. The target may consume the packet (in the case of a virtual machine), or forward it (e.g. a virtual router or dual homed virtual machine). FIGS. 17 and 18 show an example of how SoftUDC virtualizes the physical network to provide a different view to the machines in the virtual farm: FIG. 17 shows the physical network configuration and FIG. 18 the virtual network configuration. In FIG. 17, an alpha VMM and a beta VMM are physical servers coupled by a physical network link, and having network addresses as shown. VM 1 is running on alpha and VM 2 is running on beta. VM1 and VM2 are connected by two vnets, virtual networks, 1 and 2 shown in FIG. 18. Hence VM1 and VM2 each have two vnet addresses.

Other entities sharing the same physical network, but not part of the same virtual farm, cannot read the data in a packet or send packets to entities in that virtual farm. One approach for ensuring this is by optionally encapsulating Etherip packets using IPSEC Encapsulated Security Payload (ESP) in a VNET to provide message authentication and confidentiality. IPSEC encryption ensures the data cannot be read by any entity except the intended target. IPSEC authentication ensures that only entities within the virtual farm can send data, other entities attempting to authenticate will not be recognized as belonging to the virtual farm.

To prevent one virtual machine consuming all available bandwidth, there are facilities in the virtual machine monitor (e.g. Xen) to limit the bandwidth available to a virtual machine. This means that SoftUDC physical machines cannot consume all available bandwidth, unless a VMM is compromised. However, it does not prevent other non-SoftUDC entities sharing the same network consuming all available bandwidth. If the latter is a concern, then non-SoftUDC entities need to be moved to a separate network.

SoftUDC can also provide a virtual firewall that can be incorporated by a virtual farm administrator. The virtual firewall is an ordinary Linux based firewall running in a separate multi-homed virtual machine. This allows designers to configure DMZs (where a DMZ is typically a computer or small network that sits between a trusted internal network and an untrusted external network) and exercise control over the flow of network traffic into, out of and through their virtual networks.

The SoftUDC network virtualization makes it easy to create multi-tier virtual networks. Two virtual servers can reside on the same physical machine and yet be in completely different networks. This makes it very easy to isolate sensitive virtual machines into separate networks behind virtual firewalls to make it very difficult for an attacker to access them.

Particular issues do arise when wide area VNETs are required. These are discussed below. VNET transport and VARP both use multicast, so VNET packets will normally be restricted to the local LAN segment, and VARP will not be able to discover VIFs hosted further away. In a network supporting multicast routing, this can be remedied by routing the VNET multicast address to the relevant LANs. However, multicast routing is often not supported. A special-purpose daemon, vnetd, is used to support wide-area VNETs. One vnetd is run on each LAN segment hosting VIFs and each vnetd is connected to all the others. Each vnetd forwards local VNET multicasts to its peers, and resends forwarded multicasts locally. These daemons also forward VARP requests and replies.

Vnetds are transparent to VMMs, and encapsulated VNET traffic normally goes direct to the hosting machine, not through the vnetds. This is because VARP forwarding ensures that VMMs discover the address of the hosting machine even if the VIF is remote.

FIG. 19 illustrates the general arrangements for traffic in wide area VNETs as described above. It shows a number of virtual machines vmm1-vmm6 on three separate LAN segments or subnets. Each subnet is provided with a vnetd, labelled vnetd1-vnetd3, hosted by hosts h1-h3 respectively.

The above describes a SoftUDC implementation of overlay infrastructures. This is a pure software approach. Other implementations are possible, in particular it is possible to use specialized hardware.

Partial Hardware Alternative Using VLANs

For example networking switches could be used that support VLANs (IEEE 802.1Q—Virtual LANs). Then instead of implementing VNETs as described above, the virtual machine monitor could use VLANs, inserting the appropriate VLAN tag into each packet it receives from a virtual machine that it is hosting. Similarly a large storage array and SAN may be used instead of the storage virtualization described above. The virtual machine monitor makes the appropriate LUNs on the SAN available as virtual disks to its hosted virtual machines. This has the disadvantage that locally attached disks in physical machines cannot be used: a virtual machine that migrates between two physical machines would lose access to the locally attached disk, although the new host virtual machine monitor could make available the same target LUNs on the SAN available to it.

Implementation:

The applications can include any type of software including CAD, database, web page server, and other types. The virtual machines can be implemented using any conventional programming language, including languages such as C, and compiled following established practice. The servers and network elements can be implemented using conventional hardware with conventional processors. The processing elements need not be identical, but should be able to communicate with each other, e.g. by exchange of IP messages.

Other variations can be conceived within the scope of the claims.

The invention claimed is:

1. A system comprising:
a plurality of physical resources;
a virtual overlay infrastructure comprising virtual machines mapped onto the plurality of physical resources; and
a controller to
passivate the virtual overlay infrastructure by suspending operations of all of the virtual machines in the virtual overlay infrastructure,
during the passivation of the virtual overlay infrastructure, determine whether physical resource reservations for the virtual machines are to be changed, and
reactivate the operations of all of the virtual machines in the virtual overlay infrastructure subsequent to the passivation of the virtual overlay infrastructure.

2. The system of claim 1, wherein the controller is further to make a clone of the virtual overlay infrastructure by copying a design and any persistent state of the virtual overlay infrastructure.

3. The system of claim 2, wherein the virtual overlay infrastructure further includes an interface to an external network having externally visible addresses, and
wherein the controller is further to provide externally visible addresses for the clone different from the externally visible addresses of the interface of the virtual overlay infrastructure.

4. The system of claim 1, wherein the controller is further to suspend operations of all of the applications running on the plurality of physical resources onto which the virtual machines of the virtual overlay infrastructure are mapped and store a state of the applications in virtual storage devices.

5. The system of claim 1, wherein, during the passivation of the virtual overlay infrastructure, the controller is further to re-map the virtual machines onto the plurality of physical resources if the physical resource reservations for the virtual machines are determined to be changed.

6. The system of claim 4, wherein the controller is further to revert the virtual overlay infrastructure to a previous state prior to the passivation of the virtual overlay infrastructure by replacing the stored state with a copy of the previous state, then reactivating the virtual overlay infrastructure using the previous state.

7. The system of claim 2, wherein the controller is further to activate the cloned virtual overlay infrastructure and run the cloned virtual overlay infrastructure independently of its parent virtual overlay infrastructure.

8. The system of claim 1, the physical resources comprising a number of different servers, and the controller is to control the passivation of the virtual overlay infrastructure on the different servers.

9. The system of claim 2, further comprising an interface between the cloned virtual overlay infrastructure and another virtual overlay infrastructure of another user.

10. The system of claim 1, further comprising:
at least one anomaly detector, wherein the at least one anomaly detector is to use a clone of at least part of the virtual overlay infrastructure to create a signature of typical behavior of the virtual overlay infrastructure, and to compare operation of the virtual overlay infrastructure to the created signature to detect anomalous operation.

11. A non-transitory computer readable medium storing machine readable instructions, which when executed by a processor perform a method of managing a virtual overlay infrastructure, wherein the virtual overlay infrastructure comprises virtual machines mapped onto a plurality of physical resources, the machine readable instructions comprising code to:
passivate the virtual overlay infrastructure by suspending operations of all of the virtual machines of the virtual overlay infrastructure;
during the passivation of the virtual overlay infrastructure, determine whether physical resource reservations for the virtual machines are to be changed; and
reactivate the operations of all of the virtual machines subsequent to the passivation of the virtual overlay infrastructure.

12. The non-transitory computer readable medium of claim 11, further comprising code to make a clone of the virtual overlay infrastructure by copying a design and any persistent state of the virtual overlay infrastructure.

13. The non-transitory computer readable medium of claim 11, wherein the virtual overlay infrastructure further comprises an interface to an external network having externally visible addresses, and
wherein the machine readable instructions further comprise code to provide externally visible addresses for the clone different from the externally visible address of the interface of the virtual overlay infrastructure.

14. The non-transitory computer readable medium of claim 11, the machine readable instructions further comprising code to suspend operations of applications running on the physical resources onto which the virtual machines of the virtual overlay infrastructure are mapped and store a state of the applications in virtual storage devices.

15. The non-transitory computer readable medium of claim 11, the machine readable instructions further comprising code to, during the passivation of the virtual overlay infrastructure, re-map the virtual machines onto the plurality of physical resources if the physical resource reservations for the virtual machines are determined to be changed.

16. The non-transitory computer readable medium of claim 14, further comprising code to revert the virtual overlay infrastructure to a previous state prior to the passivation of the virtual overlay infrastructure by replacing the stored state with a copy of the previous state, then reactivating the virtual overlay infrastructure using the previous state.

17. The non-transitory computer readable medium of claim 11, further comprising code to activate the cloned virtual overlay infrastructure and run the cloned virtual overlay infrastructure independently of its parent virtual overlay infrastructure.

18. The non-transitory computer readable medium of claim 11, the physical resources comprising a number of different servers, and the machine readable instructions further comprise code to control the passivation of the virtual overlay infrastructure on the different servers.

19. A method of managing a virtual overlay infrastructure, wherein the virtual overlay infrastructure comprises virtual machines mapped onto a plurality of physical resources, the method comprising:
passivating, by one or more processors, the virtual overlay infrastructure by suspending operations of all of the virtual machines of the virtual overlay infrastructure;
during the passivation of the virtual overlay infrastructure, determining whether to maintain the physical resources reserved for the virtual overlay infrastructure; and
reactivating the operations of all of the virtual machines of the virtual overlay infrastructure subsequent to the passivation of the virtual overlay infrastructure.

20. A system comprising:
a plurality of physical resources;
a virtual overlay infrastructure comprising virtual machines mapped onto the plurality of physical resources; and
at least one anomaly detector, wherein the at least one anomaly detector is to use a clone of at least part of the virtual overlay infrastructure to create a signature of a typical behavior of the virtual overlay infrastructure, and to compare an operation of the virtual overlay infrastructure to the created signature to detect anomalous operation.

21. A system comprising:
a plurality of physical resources;
a virtual overlay infrastructure comprising virtual machines mapped onto the plurality of physical resources; and
a controller to
passivate the virtual overlay infrastructure by suspending operations of the virtual machines in the virtual overlay infrastructure,
during the passivation of the virtual overlay infrastructure, determine whether physical resource reservations for the virtual machines are to be changed, and
reactivate the operations of all of the virtual machines in the virtual overlay infrastructure subsequent to the passivation of the virtual overlay infrastructure.

* * * * *